(12) United States Patent
Kaneko et al.

(10) Patent No.: US 10,477,123 B2
(45) Date of Patent: Nov. 12, 2019

(54) IMAGE SENSOR, ELECTRONIC APPARATUS, SIGNAL TRANSMISSION SYSTEM, AND CONTROL METHOD

(71) Applicant: SONY SEMICONDUCTOR SOLUTIONS CORPORATION, Kanagawa (JP)

(72) Inventors: Kazuaki Kaneko, Kanagawa (JP); Yoshinori Takagi, Kanagawa (JP); Nobutaka Shimamura, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 0 days.

(21) Appl. No.: 15/327,443

(22) PCT Filed: Jul. 17, 2015

(86) PCT No.: PCT/JP2015/070496
§ 371 (c)(1),
(2) Date: Jan. 19, 2017

(87) PCT Pub. No.: WO2016/017449
PCT Pub. Date: Feb. 4, 2016

(65) Prior Publication Data
US 2017/0180655 A1 Jun. 22, 2017

(30) Foreign Application Priority Data
Jul. 29, 2014 (JP) ................. 2014-153561

(51) Int. Cl.
*H04N 5/357* (2011.01)
*H04N 5/374* (2011.01)
*H04N 5/378* (2011.01)

(52) U.S. Cl.
CPC ............. *H04N 5/357* (2013.01); *H04N 5/374* (2013.01); *H04N 5/378* (2013.01)

(58) Field of Classification Search
CPC ......... H04N 5/357; H04N 5/374; H04N 5/378
See application file for complete search history.

(56) References Cited

U.S. PATENT DOCUMENTS 8,059,172 B2 * 11/2011 Kondo ................... H04N 5/217
  348/241
8,094,223 B1 * 1/2012 De Wit ................ H04N 5/3742
  348/300

(Continued)

FOREIGN PATENT DOCUMENTS

JP 2010-098516 A 4/2010
JP 2011-114843 A 6/2011

(Continued)

OTHER PUBLICATIONS

International Search Report prepared by the Japan Patent Office dated Sep. 11, 2015, for International Application No. PCT/JP2015/070496.

*Primary Examiner* — Lin Ye
*Assistant Examiner* — Chriss S Yoder, III
(74) *Attorney, Agent, or Firm* — Sheridan Ross P.C.

(57) ABSTRACT

The present technology relates to an image sensor, an electronic apparatus, a signal transmission system, and a control method that are capable of easily reducing adverse effects of a parasitic capacitance. An assist signal line is adjacent to a VSL and placed along the VSL, a signal output from a pixel flowing through the VSL, and a signal control unit causes a similar signal to flow through the assist signal line, the similar signal having a similarity to a signal that flows through the VSL. The present technology is applicable to, for example, an image sensor including a VSL through which a signal output from a pixel flows, and a signal transmission system including a transmission path through which a signal flows.

10 Claims, 17 Drawing Sheets

(56) References Cited

U.S. PATENT DOCUMENTS

| | | | |
|---|---|---|---|
| 9,602,749 B2* | 3/2017 | Yamaguchi | H04N 5/37457 |
| 2010/0097510 A1* | 4/2010 | Wada | H04N 5/3742 |
| | | | 348/308 |
| 2011/0026621 A1* | 2/2011 | Kim, II | H04B 3/542 |
| | | | 375/260 |
| 2011/0128423 A1* | 6/2011 | Lee | H01L 27/14621 |
| | | | 348/294 |
| 2011/0176045 A1* | 7/2011 | Ahn | H01L 27/14603 |
| | | | 348/308 |

FOREIGN PATENT DOCUMENTS

| | | |
|---|---|---|
| JP | 2011-234243 | 11/2011 |
| JP | 2013-501482 A | 1/2013 |

\* cited by examiner

IMAGE SENSOR, ELECTRONIC APPARATUS, SIGNAL TRANSMISSION SYSTEM, AND CONTROL METHOD

This application is a national stage application under 35 U.S.C. 371 and claims the benefit of PCT Application No. PCT/JP2015/070496 having an international filing date of 17 Jul. 2015, which designated the United States, which PCT application claimed the benefit of Japanese Patent Application No. 2014-153561 filed 29 Jul. 2014, the disclosures of which are incorporated herein by reference in their entirety.

TECHNICAL FIELD

The present technology relates to an image sensor, an electronic apparatus, a signal transmission system, and a control method, and particularly to an image sensor, an electronic apparatus, a signal transmission system, and a control method that are capable of easily reducing adverse effects of a parasitic capacitance, for example.

BACKGROUND ART

In an image sensor, a signal output from a pixel (a signal read from a pixel) flows through a VSL (Vertical Signal Line), thereby changing the voltage of the VSL (hereinafter, referred to also as VSL voltage). The VSL voltage is acquired as a pixel value.

In order to increase the speed of the image sensor, it needs to shorten the setting time of the VSL voltage. However, the VSL has a parasitic capacitance, and the adverse effects of the parasitic capacitance block the shortening of the setting time of the VSL voltage.

Specifically, current flows in the VSL from the parasitic capacitance, thereby reducing current caused to flow by a current source as a load circuit, which constitutes an SF (Source Follower) with an amplification transistor constituting a pixel, by the amount corresponding to the current that flows in the VSL from the parasitic capacitance. The reduction in current caused to flow by the current source blocks the shortening of the setting time of the VSL voltage.

In view of the above, the applicant has proposed a technology that reduces adverse effects of a parasitic capacitance and shortens the setting time of the VSL voltage (furthermore, increase the speed of the image sensor (solid-state image sensor)) by connecting a replica circuit that increases the current caused to flow by the current source by the amount corresponding to the current that flows in the VSL from the parasitic capacitance to the VSL and causing current depending on the slew rate of the VSL to flow from the replica circuit to the VSL (see, for example, Patent Literature 1).

CITATION LIST

Patent Literature

Patent Literature 1: Japanese Patent Application Laid-open No. 2011-234243

DISCLOSURE OF INVENTION

Technical Problem

In the technology described in Patent Literature 1, a signal is fed back from the replica circuit to the VSL. For that reason, it needs to design a circuit so that a problem does not occur in the convergence of the fed-back signal.

In this regard, a proposal of a technology that is capable of easily reducing adverse effects of a parasitic capacitance without feedback is requested.

The present technology has been made in view of the above circumstances to be capable of easily reducing adverse effects of a parasitic capacitance.

Solution to Problem

An image sensor according to the present technology is an image sensor including: a VSL (Vertical Signal Line), a signal output from a pixel flowing through the VSL; an assist signal line that is adjacent to the VSL and placed along the VSL; and a signal control unit that causes a similar signal to flow through the assist signal line, the similar signal having a similarity to a signal that flows through the VSL.

A first control method according to the present technology is a control method, including causing, by an image sensor including a VSL (Vertical Signal Line), a signal output from a pixel flowing through the VSL, and an assist signal line that is adjacent to the VSL and placed along the VSL, a similar signal to flow through the assist signal line, the similar signal having a similarity to a signal that flows through the VSL.

An electronic apparatus according to the present technology is an electronic apparatus including an optical system that collects light; and an image sensor that receives light and picks up an image, the image sensor including a VSL (Vertical Signal Line), a signal output from a pixel flowing through the VSL, an assist signal line that is adjacent to the VSL and placed along the VSL, and a signal control unit that causes a similar signal to flow through the assist signal line, the similar signal having a similarity to a signal that flows through the VSL.

In such image sensor, electronic apparatus, and first control method, a similar signal is caused to flow through as assist signal line that is adjacent to a VSL through which a signal output from a pixel flows and placed along the VSL. The similar signal has a similarity to a signal that flows through the VSL.

A signal transmission system according to the present technology is a signal transmission system including: a wired assist transmission path that is adjacent to a wired signal transmission path and placed along the signal transmission path, a signal output from a transmitter flowing through the signal transmission path; and a signal control unit that causes a similar signal to flow through the assist transmission path, the similar signal having a similarity to a signal that flows through the signal transmission path.

A second control method according to the present technology is a control method including causing, by a signal transmission system including an assist transmission path that is adjacent to a signal transmission path and placed along the signal transmission path, a signal output from a transmitter flowing through the signal transmission path, a similar signal to flow through the assist transmission path, the similar signal having a similarity to a signal that flows through the signal transmission path.

In such signal transmission system and second control method, a similar signal is caused to flow through an assist transmission path that is adjacent to a signal transmission path through which a signal output from a transmitter flows and placed along the signal transmission path. The similar signal has a similarity to a signal that flows through the signal transmission path.

Note that the image sensor may be an independent apparatus or may be an internal block configuring a single apparatus.

Advantageous Effects of Invention

In accordance with the present technology, it is possible to easily reduce adverse effects of a parasitic capacitance.

It should be noted that the effect described here is not necessarily limitative and may be any effect described in the present disclosure.

MODE(S) FOR CARRYING OUT THE INVENTION

<Embodiment of Digital Camera to which Present Technology is Applied>

Figure 1:
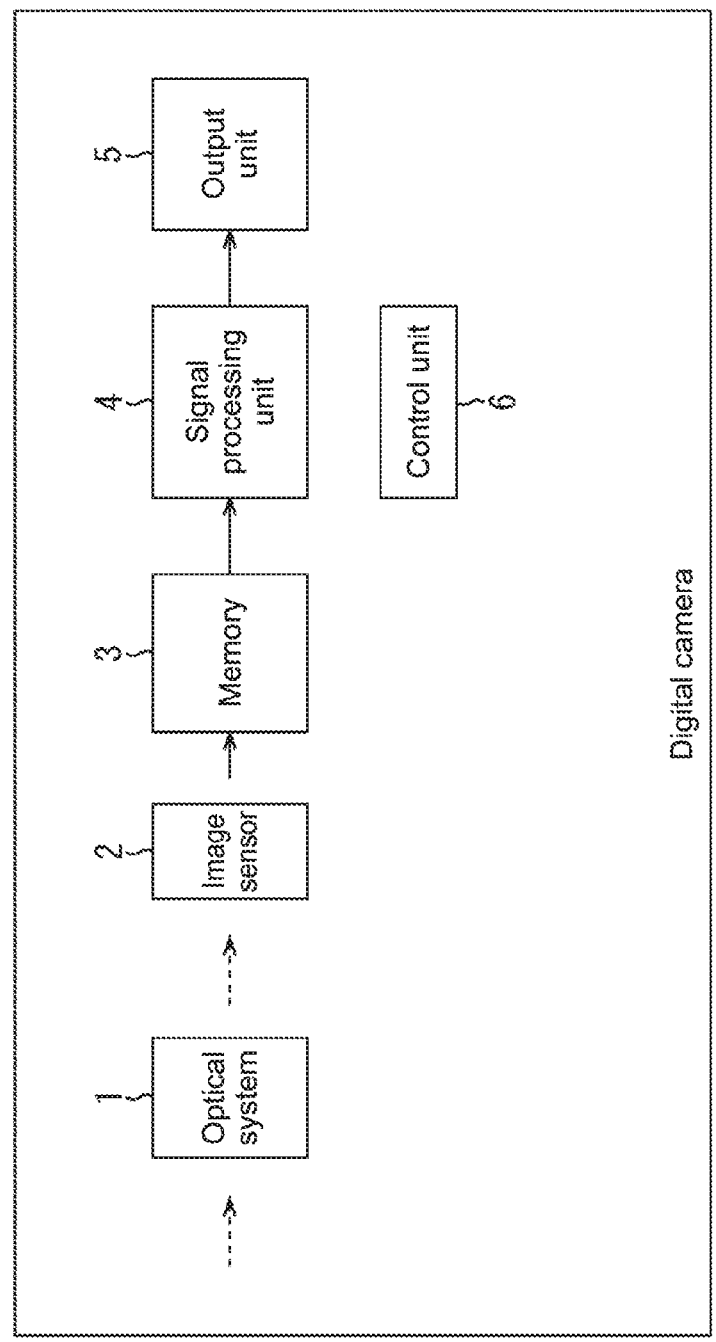
FIG. 1 A block diagram showing a configuration example of an embodiment of a digital camera to which the present technology is applied.

FIG. 1 is a block diagram showing a configuration example of an embodiment of a digital camera to which the present technology is applied.

Note that the digital camera is capable of picking up any of a still image and a moving image.

In FIG. 1, the digital camera includes as optical system 1, an image sensor 2, a memory 3, a signal processing unit 4, an output unit 5, and a control unit 6.

The optical system 1 includes, for example, a zoom lens, a focusing lens, an aperture, and the like, which are not shown, and causes outside light to enter the image sensor 2.

The image sensor 2 is, for example, a CMOS (Complementary Metal Oxide Semiconductor) image sensor. The image sensor 2 receives light entered from the optical system 1, performs photoelectric conversion on the received light, and outputs image data corresponding to the light entered from the optical system 1.

The memory 3 temporarily stores the image data output from the image sensor 2.

The signal processing unit 4 performs processing such as noise removal and adjustment of white balance as signal processing using the image data stored in the memory 3, and supplies it to the output unit 5.

The output unit 5 outputs the image data supplied from the signal processing unit 4.

Specifically, the output unit 5 includes a display (not shown) formed of, for example, liquid crystal, and displays, as a so-called through image, an image corresponding to image data supplied from the signal processing unit 4.

Further, the output unit 5 includes a driver (not shown) that drives a recording medium such as a semiconductor memory, a magnetic disc, and an optical disc, and stores the image data supplied from the signal processing unit 4 in the recording medium.

Further, the output unit 5 includes a communication interface, and transmits the image data supplied from the signal processing unit 4 in wireless or wired communication.

The control unit 6 controls the respective blocks constituting the digital camera in accordance with a user's operation or the like.

In the digital camera configured as described above, the image sensor 2 receives light entered from the optical system 1, and outputs image data depending on the entered light.

The image data output from the image sensor 2 is supplied to the memory 3, and stored in the memory 3. The signal processing unit 4 performs signal processing on the image data stored in the memory 3, and the resulting image data is supplied to the output unit 5 and output from the output unit 5.

<First Configuration Example of Image Sensor 2>

Figure 2:
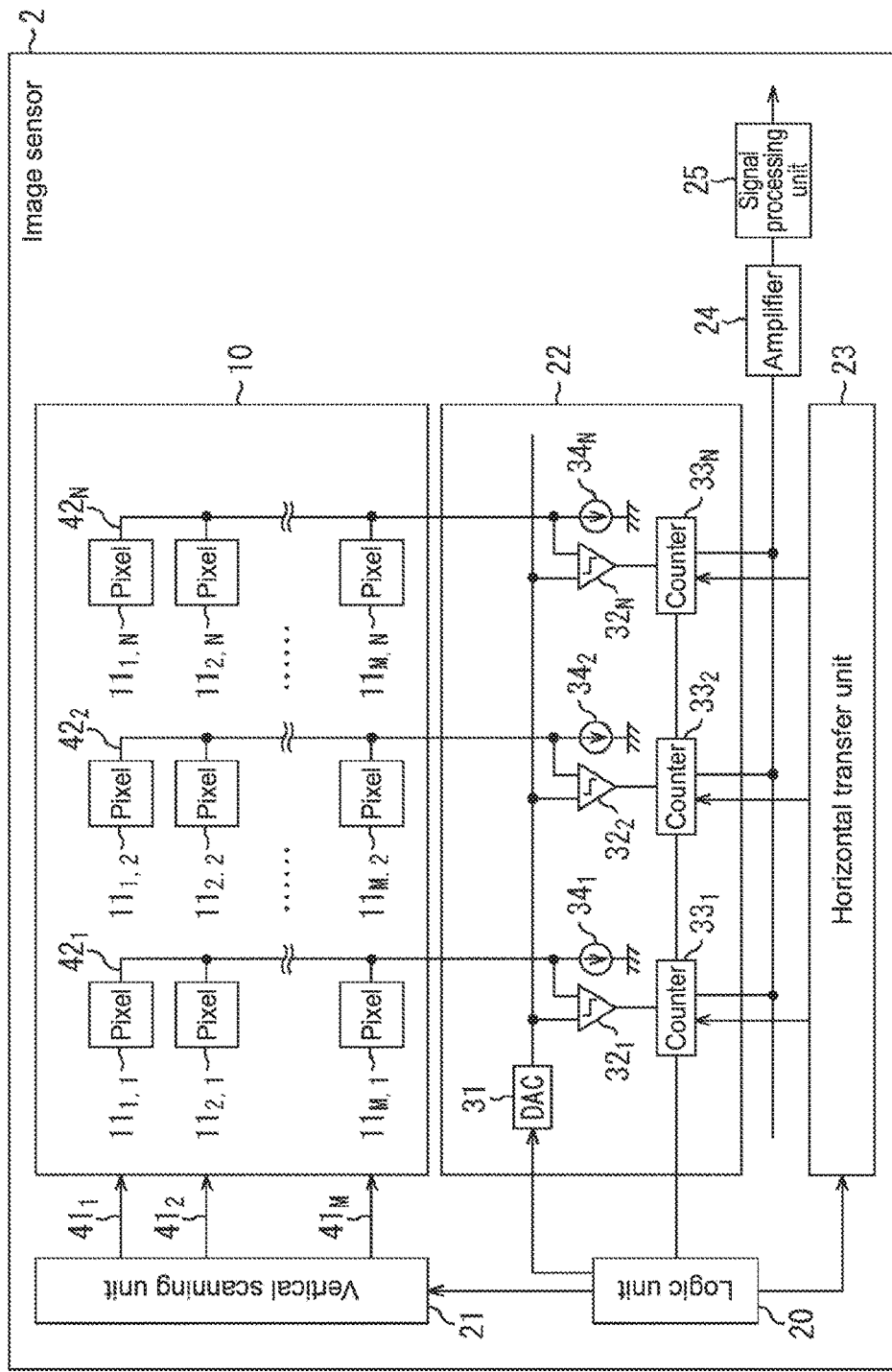
FIG. 2 A block diagram showing a first configuration example of an image sensor 2.

FIG. 2 is a block diagram showing a first configuration example of the image sensor 2 in FIG. 1

In FIG. 2, the image sensor 2 includes a pixel unit 10, a logic unit 20, a vertical scanning unit 21, a column processing unit 22, a horizontal transfer unit 23, an amplifier 24, a signal processing unit 25, pixel control lines $41_1$ to $41_M$, and VSLs $42_1$ to $42_N$.

The pixel unit 10 includes M×N (M and N each represent an integer not less than 1 (integer of 1 or 2 or more) pixels $11_{1, 1}, 11_{1, 2}, \ldots, 11_{1, N}, 11_{2, 1}, 11_{2, 2}, \ldots, 11_{2, N}, \ldots, 11_{M, 1}, 11_{M, 2}, \ldots, 11_{M, N}$ that perform photoelectric conversion, and functions as an imaging unit (image sensor) that picks up an image.

The M×N pixels $11_{1, 1}$ to $11_{M, N}$ are arranged in a matrix (grid) pattern of M rows and N columns on a two-dimensional plane.

To the N pixels $11_{m, 1}$ to $11_{m, N}$ arranged in the row direction (horizontal direction) of the m-th (m=1, 2, ..., M) row of the pixel unit 10 (from the top), the pixel control line $41_m$ that extend in the row direction is connected.

Further, to the M pixels $11_{1,n}$ to $11_{M,n}$ arranged in the column direction (vertical direction) of the n-th (n=1, 2, . . . , N) column (from the left), the VSL $42_n$ that extends is the column direction is connected.

The pixel $11_{m,n}$ performs photoelectric conversion on light that enters the pixel $11_{m,n}$ (incident light). Further, the pixel $11_{m,n}$ outputs, to the VSL $42_n$ to which a current source $34_n$ is connected, voltage (electric signal) corresponding to charges acquired by the photoelectric conversion, in accordance with control of the vertical scanning unit 21 via the pixel control line $41_m$.

Note that the pixel $11_{m,n}$ is capable of performing photoelectric conversion on light in a predetermined color, which is incident via a Bayer array color filter (not shown), for example.

The logic unit 20 controls the vertical scanning unit 21, (a DAC 31, counters $33_n$, and the like, constituting) the column processing unit 22, and the horizontal transfer unit 23 in accordance with a predetermined logic or the like.

The vertical scanning unit 21 controls (drives) the pixels $11_{m,1}$ to $11_{m,N}$ connected to the pixel control line $41_m$ via the pixel control line $41_m$ in accordance with control of the logic unit 20. The vertical scanning unit 21 sequentially drives the N pixels $11_{m,1}$ to $11_{m,N}$ in the first to M-th rows of the pixel unit 10 from the first line, and causes the pixels to $11_{m,1}$ to $11_{m,N}$ to output signals to the VSLs $42_1$ to $42_N$ row by row.

The column processing unit 22 is connected to the pixels $11_{m,1}$ to $11_{m,N}$ arranged in one row in the N columns via the VSLs $42_1$ to $42_N$, respectively. Accordingly, an electric signal (voltage) (hereinafter, referred to also as VSL signal) output from the pixel $11_{m,n}$ to the VSL $42_n$ is supplied to the column processing unit 22.

The column processing unit 22 performs, in parallel, AD conversion of N VSL signals supplied from the pixels $11_{m,1}$ to $11_{m,N}$ arranged in one row in the N columns via the VSL $42_1$ to $42_N$, and supplies the resulting digital data to the horizontal transfer unit 23 as respective pixel values (pixel data) of the pixels $11_{m,1}$ to $11_{m,N}$.

Note that the column processing unit 22 is capable of not only performing, in parallel, AD conversion of all electric signals of the N pixels $11_{m,1}$ to $11_{m,N}$ arranged in one row but also performing, in parallel, AD conversion of the electric signals of one or more less than N pixels out of the N pixels $11_{m,1}$ to $11_{m,N}$.

It should be noted that in the following, assumption is made that the column processing unit 22 performs, in parallel, AD conversion of all VSL signals of the N pixels $11_{m,1}$ to $11_{m,N}$ arranged in one row, to simplify the description.

The column processing unit 22 includes N comparators $32_1$ to $32_N$ and N counters $33_1$ to $33_N$ to perform, in parallel, AD conversion of all VSL signals of the N pixels $11_{m,1}$ to $11_{m,N}$ arranged in one row.

Further, the column processing unit 22 includes the DAC (Digital to Analog Converter) 31 and N current sources $34_1$ to $34_N$.

The DAC 31 performs DA (Digital to Analog) conversion, thereby supplying (outputting), to the comparators $32_1$ to $32_N$, a reference signal having time in which the level (voltage) is changed from a predetermined initial value to a predetermined final value with a certain inclination like a ramp signal.

The comparator $32_n$ is connected to the VSL $41_n$. Accordingly, to the comparator 32, the VSL signal (electric signal) output from the pixel $11_{m,n}$ to the VSL $41_n$ is supplied.

The comparator $32_n$ compares the VSL signal supplied from the pixel $11_{m,n}$ with the reference signal supplied from the DAC 31, and supplies a comparison result signal that represents the comparing result to the counter $33_n$.

The counter $33_n$ counts the time necessary for the level of the reference signal to be changed until the level of the VSL signal of the pixel $11_{m,n}$ and the level of the reference signal match (until the magnitude relationship between the VSL signal and the reference signal is reversed) on the basis of the comparison result signal supplied from the comparator $32_n$, thereby performing AD (Analog to Digital) conversion of the VSL signal of the pixel $11_{m,n}$. Further, the counter $33_n$ performs CDS (Correlated Double Sampling) to acquire digital data as a pixel value.

Note that to the counter $33_n$, clocks are supplied from the logic unit 20. In the counter $33_n$, the counting of the time necessary for the level of the reference signal to be changed until the level of the VSL signal of the pixel $11_{m,n}$ and the level of the reference signal match is performed by counting clocks supplied from the logic unit 20.

Further, since the vertical scanning unit 21 drives the pixel $11_{m,n}$, the VSL signals of the N pixels $11_{m,1}$ to $11_{m,N}$ in each row of the first to M-th rows of the pixel unit 10 are sequentially supplied from the first row, for example, to the N comparators $32_1$ to $32_N$, and AD conversion and CDS of the VSL signals are performed row by row.

Note that since AD conversion of the VSL signal is performed in the comparator $32_n$ and the counter $33_n$ as described above, it can be said that the comparator $32_n$ and the counter $33_n$ constitute an ADC (Analog to Digital Converter).

The current source $34_n$ is connected between the VSL $42_n$ and ground, and causes constant current to flow through the VSL $42_n$. The current source $34_n$ constitutes an SF with a FET 55 constituting the pixel $11_{m,n}$, which is an amplification transistor to be described later, and is a load of the SF.

The horizontal transfer unit 23 performs transfer control for reading a counter value, i.e., digital data as a pixel value from the counter $33_n$, and causes the counter $33_n$ to transfer it to the amplifier 24, in accordance with control of the logic unit 20.

The amplifier 24 amplifies the pixel value transferred from the counter $33_n$, and supplies it to the signal processing unit 25.

The signal processing unit 25 performs necessary signal processing on the pixel value supplied from the amplifier 24, and outputs it to the outside (the memory 3 (FIG. 1) in this embodiment).

Note that although the CDS is performed in addition to the AD conversion in the comparator $32_n$ and the counter $33_n$ in the above, only the AD conversion may be performed in the comparator $32_n$ and the counter $33_n$ and the CDS may be performed in the signal processing unit 25.

<Configuration Example of Pixel $11_{m,n}$>

Figure 3:
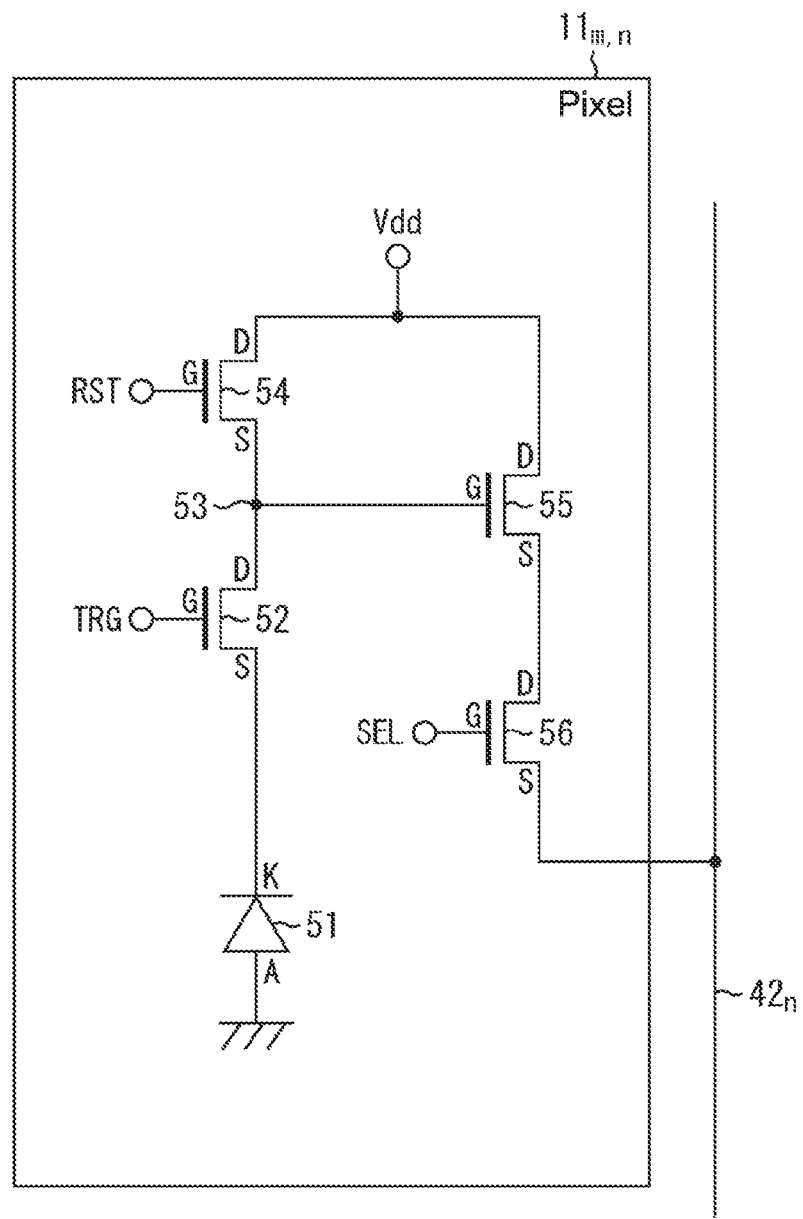
FIG. 3 A circuit diagram showing a configuration example of a pixel $11_{m, n}$.

FIG. 3 is a circuit diagram showing a configuration example of the pixel $11_{m,n}$ in FIG. 2.

In FIG. 3, the pixel $11_{m,n}$ includes a PD 51 and four NMOS (negative channel MOS) FETs (Field Effect Transistors) 52, 54, 55, and 56.

Further, in the pixel $11_{m,n}$, the drain of the FET 52, the source of the FET 54, and the gate of the FET 55 are connected to each other, and an FD (Floating Diffusion) (capacitance) 53 for converting charges into voltage is formed on the connection point.

The PD 51 is an example of a photoelectric conversion element that performs photoelectric conversion, and perform photoelectric conversion by receiving incident light and storing charges corresponding to the incident light.

The anode of the PD 51 is connected to ground (grounded), and the cathode of the PD 51 is connected to the source of FET 52.

The FET 52 is a FET for transferring the charges stored in the PD 51 from the PD 51 to the FD 53, and is referred to also as transfer Tr 52 in the following.

The source of the transfer Tr 52 is connected to the cathode of the PD 51, and the drain of the transfer Tr 52 is connected to the source of the FET 54 via the PD 53.

Further, the gate of the transfer Tr 52 is connected to the pixel control line 41$_m$, and a transfer pulse TRG is supplied to the gate of the transfer Tr 52 via the pixel control line 41$_m$.

Note that the vertical scanning unit 21 (FIG. 2) causes a control signal, which includes a rest pulse RST and a selection pulse SEL to be described later in addition to the transfer pulse TRG, to flow through the pixel control line 41$_m$ to drive (control) the pixel 11$_{m,n}$ via the pixel control line 41$_m$.

The FD 53 is an area formed at the connection point of the drain of the transfer Tr 52, the source of the FET 54, and the gate of the FET 55 where charges are converted into voltage like a capacitor.

The FET 54 is a FET for resetting the charges (voltage (potential)) stored in the FD 53, and is referred to also as reset Tr 54 in the following.

The drain of the reset Tr 54 is connected to a power supply Vdd.

Further, the gate of the reset Tr 54 is connected to the pixel control line 41$_m$, and the reset pulse RST is supplied to the gate of the reset Tr 54 via the pixel control line 41$_m$.

The FET 55 is a FET for buffering the voltage of the FD 53, and is referred to also as amplification Tr 55 in the following.

The gate of the amplification Tr 55 is connected to the FD 53, and the drain of the amplification Tr 55 is connected to the power supply Vdd. Further, the source of the amplification Tr 55 is connected to the drain of the FET 56.

The FET 56 is a FET for selecting the output of the electric signal (VSL signal) to the VSL 42$_n$, and is referred to also as selection Tr 56 in the following.

The source of the selection Tr 56 is connected to the VSL 42$_n$.

Further, the gate of the selection Tr 56 is connected to the pixel control line 41$_m$, and the selection pulse SEL is supplied to the gate of the selection Tr 56 via the pixel control line 41$_m$.

Note that because the source of the amplification Tr 55 is connected to the current source 34$_n$ (FIG. 2) via the selection Tr 56 and the VSL 42$_n$, the amplification Tr 55 and the current source 34, constitute (a circuit of) an SF. Therefore, the FD 53 is connected to the VSL 42$_n$ via the SF.

Note that the pixel 11$_{m,n}$ can be configured without the selection Tr 56.

Further, as the configuration of the pixel 11$_{m,n}$, it is possible to employ the configuration a shared pixel in which a set of a plurality of PDs 51 and a plurality of transfer Trs 52 shares the FD 53 to the selection Tr 56.

In the pixel 11$_{m,n}$ configured as described above, the PD 51 receives light that enters the PD 51, and performs photoelectric conversion on the light, thereby starting to store charges depending on the amount of received incident light. Note that assumption is made that the selection pulse SEL is at an H level and the selection Tr 56 is in an on-state to simplify the description here.

When predetermined time (exposure time) is elapsed after the PD 51 starts to store charges, the vertical scanning unit 21 (FIG. 2) temporarily sets the transfer pulse TRG (from the L (Low) level) to the H (High) level.

The transfer pulse TRG is temporarily set to the H level. Accordingly, the transfer Tr 52 becomes temporarily in the on-state.

When the transfer Tr 52 is in the on-state, the charges stored in the PD 51 are transferred to the FD 53 via the transfer Tr 52, and stored.

The vertical scanning unit 21 temporarily sets the reset pulse RST to the H level before temporarily setting the transfer pulse TRG to the H level. Accordingly, the vertical scanning unit 21 temporarily makes the reset Tr 54 be in the on-state.

The reset Tr 54 becomes in the on-state. Accordingly, the FD 53 is connected to the power supply Vdd via the reset Tr 54, and the charges in the FD 53 are swept to the power supply Vdd via the reset Tr 54 and reset.

Note that the FD 53 is connected to the power supply Vdd and the charges in the FD 53 are reset as described above, which is resetting of the pixel 11$_{m,n}$.

After the charges in the FD 53 are reset, the vertical scanning unit 21 temporarily sets the transfer pulse TRG to the H level as described above. Accordingly, the transfer Tr 52 becomes temporarily in the on-state.

The transfer Tr 52 becomes in the on-state. Accordingly, the charges stored in the PD 51 are transferred to the reset ED 53 via the transfer Tr 52, and stored.

The voltage (potential) corresponding to the charges stored in the PD 53 is output to the VSL 42$_n$ via the amplification Tr 55 and the selection Tr 56 as the VSL signal.

In the comparator 32$_n$ and the counter 33$_n$ (FIG. 2) connected to the VSL 42$_n$, AD conversion is performed on a reset level as the VSL signal right after the pixel 11$_{m,n}$ is reset.

Further, in the comparator 32$_n$ and the counter 33$_n$, AD conversion is performed on the signal level (including the reset level and a level as a pixel value) as the VSL signal (voltage corresponding to the charges stored in the PD 51 and transferred to the FD 53) after the transfer Tr 52 temporarily becomes in the on-state.

Then, in the comparator 32$_n$ and the counter 33$_n$, the CDS in which the difference between the result of AD conversion of the reset level (hereinafter, referred to also as reset level AD value) and the result of AD conversion of the signal level (hereinafter, referred to also as signal level AD value), for example, is acquired as the pixel value is performed.

The CDS can be performed by, for example, decrementing (or incrementing) the count value in the counter 33$_n$ at the time of AD conversion of the reset level, and incrementing (or decrementing) the count value at the time of AD conversion of the signal level.

Note that in the first configuration example of the image sensor 2 in FIG. 2, it is difficult to reduce adverse effects of the parasitic capacitance of the VSL 42$_n$.

<Second Configuration of Image Sensor 2>

Figure 4:
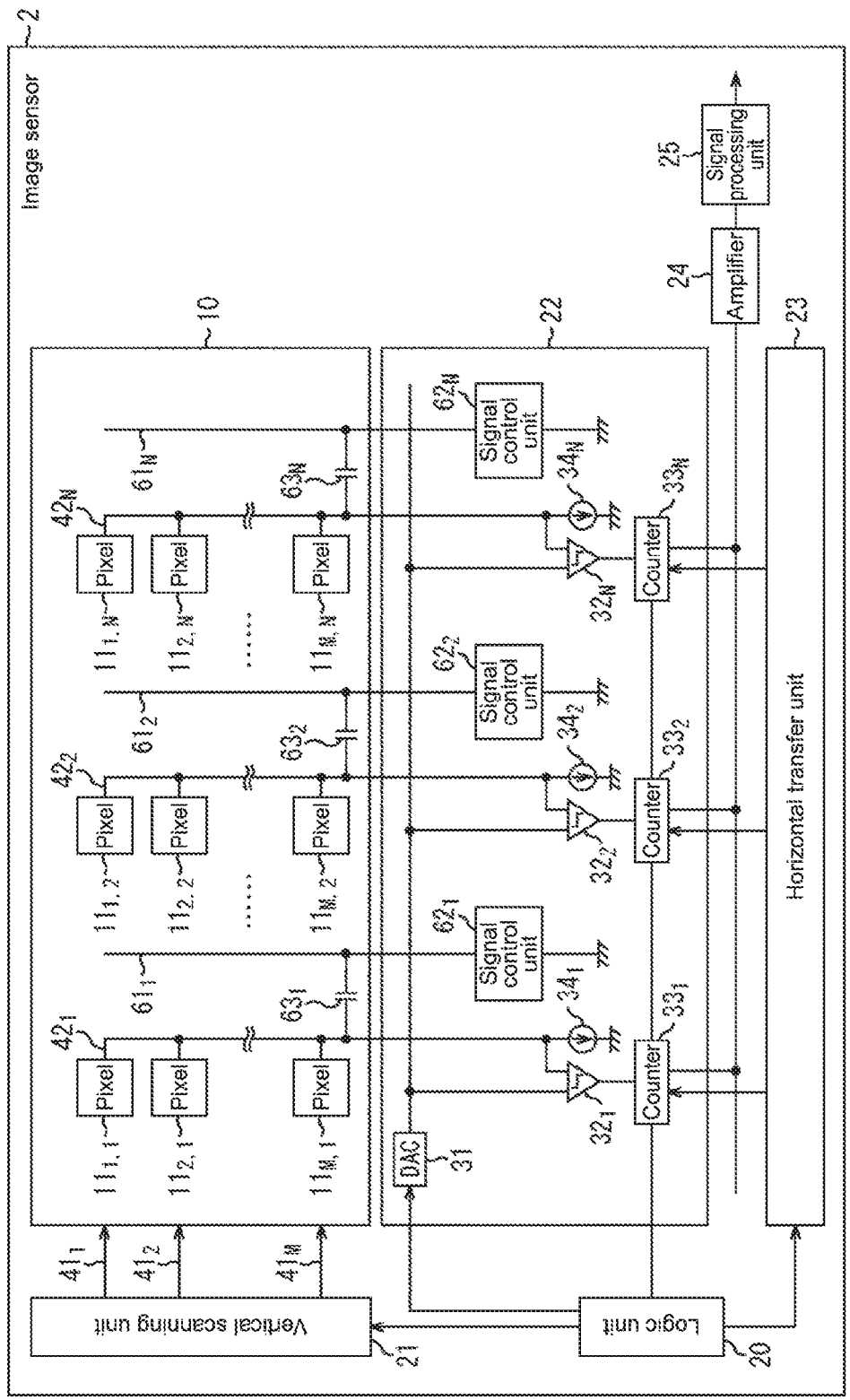
FIG. 4 A block diagram showing a second configuration example of the image sensor 2.

FIG. 4 is a block diagram showing a second configuration example of the image sensor 2 in FIG. 1.

Note that in the figure, the components corresponding to those in FIG. 2 will be denoted by the same reference symbols and a description thereof will be appropriately omitted in the following.

In FIG. 4, the image sensor 2 is the same as that in FIG. 2 in that the image sensor 2 includes the pixel unit 10, the logic unit 20, the vertical scanning unit 21, the column processing unit 22, the horizontal transfer unit 23, the amplifier 24, the signal processing unit 25, the pixel control lines 41$_1$ to 41$_M$, and the VSL 42$_1$ to 42$_N$.

It should be noted that in FIG. 4, the image sensor 2 is different from that in FIG. 2 in that the image sensor 2 includes assist VSLs $61_1$ to $61_N$, signal control units $62_1$ to $62_N$, and capacitances $63_1$ to $63_N$.

The assist VSL $61_n$ is adjacent to the VSL $42_n$ (without sandwiching a conductor therebetween), is a linear conductor as an assist signal line placed along the VSL $42_n$, and is capacitively coupled to the VSL $42_n$ by the capacitance 63.

The signal control unit $62_n$ performs signal control for causing a similar signal (signal (substantially) similar to the VSL signal) to flow through the assist VSL $61_n$. The similar signal has a similarity to the VSL signal that flows through the VSL $42_n$.

Note that the similar signal having a similarity to the VSL signal includes the same signal as the VSL signal in addition to a signal similar to the VSL signal.

The capacitance $63_n$ is a capacitance that capacitively couples the VSL $42_n$ and the assist VSL $61_n$ to each other. The capacitance $63_n$ may be a parasitic capacitance between the VSL $42_n$ and the VSL $61_n$, or an actual capacitance, i.e., an actual capacitor connected between the VSL $42_n$ and the assist VSL $61_n$.

In the image sensor 2 configured as described above, the signal control unit $62_n$ causes the similar signal to flow through the assist VSL $61_n$. The similar signal has a similarity to the VSL signal that flows through VSL $42_n$.

As a result, regarding the VSL $42_n$ and the assist VSL $61_n$, (adverse) effects of the parasitic capacitance of the VSL $42_n$ are easily reduced by the equal potential without feedback of a signal, and it is possible to reduce the degree to which shortening of the setting time of the VSL voltage of the VSL $42_n$ due to current flowing in the VSL $42_n$ from the parasitic capacitance of the VSL $42_n$ is blocked.

Note that although the signal control unit $62_n$ is provided to the column processing unit 22 in FIG. 4, the signal control unit $62_n$ may be provided to the pixel unit 10, for example. Further, the signal control unit $62_n$ may be provided to be divided into the pixel unit 10 and the column processing unit 22, or provided separately from the pixel unit 10 and the column processing unit 22.

Figure 5:
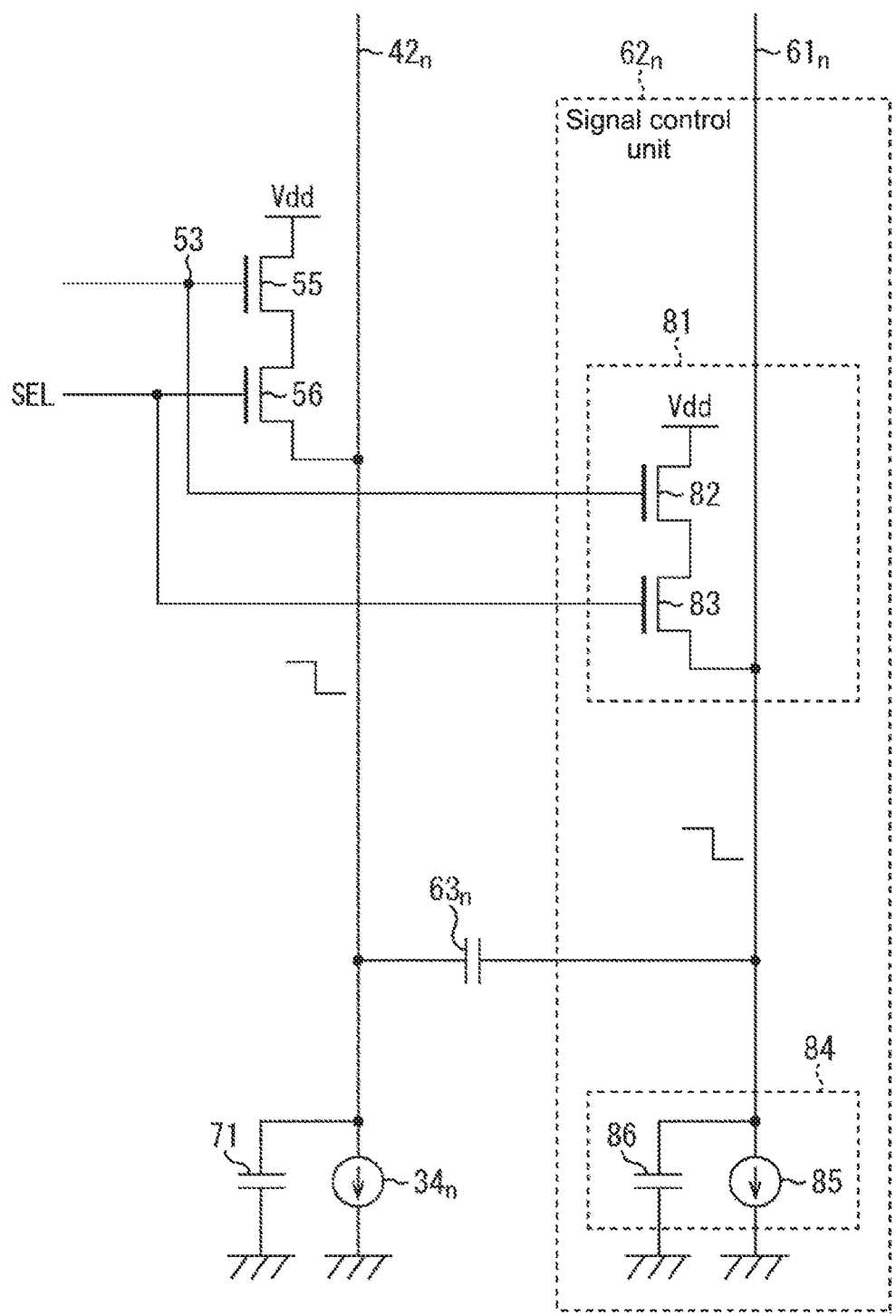
FIG. 5 A circuit diagram showing details of the second configuration example of the image sensor 2.

FIG. 5 is a circuit diagram showing details of the second configuration example of the image sensor 2 in FIG. 4.

Note that in FIG. 5, only a part of the image sensor 2 in FIG. 4, i.e., part of (the FD 53, the amplification Tr 55, and the selection Tr 56 constituting) the pixel $11_{m,n}$, the current source $34_n$, the VSL $42_n$, the assist VSL $61_n$, and the signal control unit $62_n$, are shown.

In FIG. 5, a capacitance 71 is a parasitic capacitance of the VSL $42_n$.

Further, in FIG. 5, the signal control unit $62_n$ includes a signal output unit 81 and a load unit 84.

The signal output unit 81 includes FETs 82 and 83.

The FET 82 is configured similarly to the amplification Tr 55. The drain, gate, and source of the FET 82 are respectively connected to the power supply Vdd, the FD 53 of the pixel $11_{m,n}$, and the drain of the FET 83.

The FET 83 is configured similarly to the selection Tr 56. The drain, gate, and source of the FET 83 are respectively connected to the source of the FET 82, the pixel control line $41_n$ to which the selection pulse SEL is supplied, and the assist VSL $61_n$.

Therefore, the FETs 82 and 83 respectively operate similarly to the amplification Tr 55 and the selection Tr 56.

The load unit 84 includes a current source 85 and a capacitance 86.

The current source 85 is configured similarly to the current source $34_n$. The current source 85 causes constant current to flow through the assist VSL $61_n$. The current source 85 constitutes an SF with the FET 83, and is a load of the SF, similarly to the current source $34_n$.

The capacitance 86 is a parasitic capacitance of the assist VSL $61_n$.

Note that there is the signal output unit 81 for each row of the pixel $11_{m,n}$. Therefore, there are M signal output units 81. It should be noted that in FIG. 5 (the same shall apply to the figures to be described later), the signal output unit 81 in a row is shown, and illustration of the signal output unit in other rows is omitted.

In the image sensor 2 configured as described above, the FETs 82 and 83 operate similarly to the amplification Tr 55 and the selection Tr 56.

Therefore, similar signals flow through the VSL $42_n$ and the assist VSL $61_n$ capacitively coupled by the capacitance $63_n$. As a result, (adverse) effects of a parasitic capacitance 71 of the VSL $42_n$ are reduced, and it is possible to reduce the degree to which shortening of the setting time of the VSL voltage of the VSL $42_n$ due to current flowing in the VSL $42_n$ from the parasitic capacitance 71 of the VSL $42_n$ is blocked.

Figure 6:
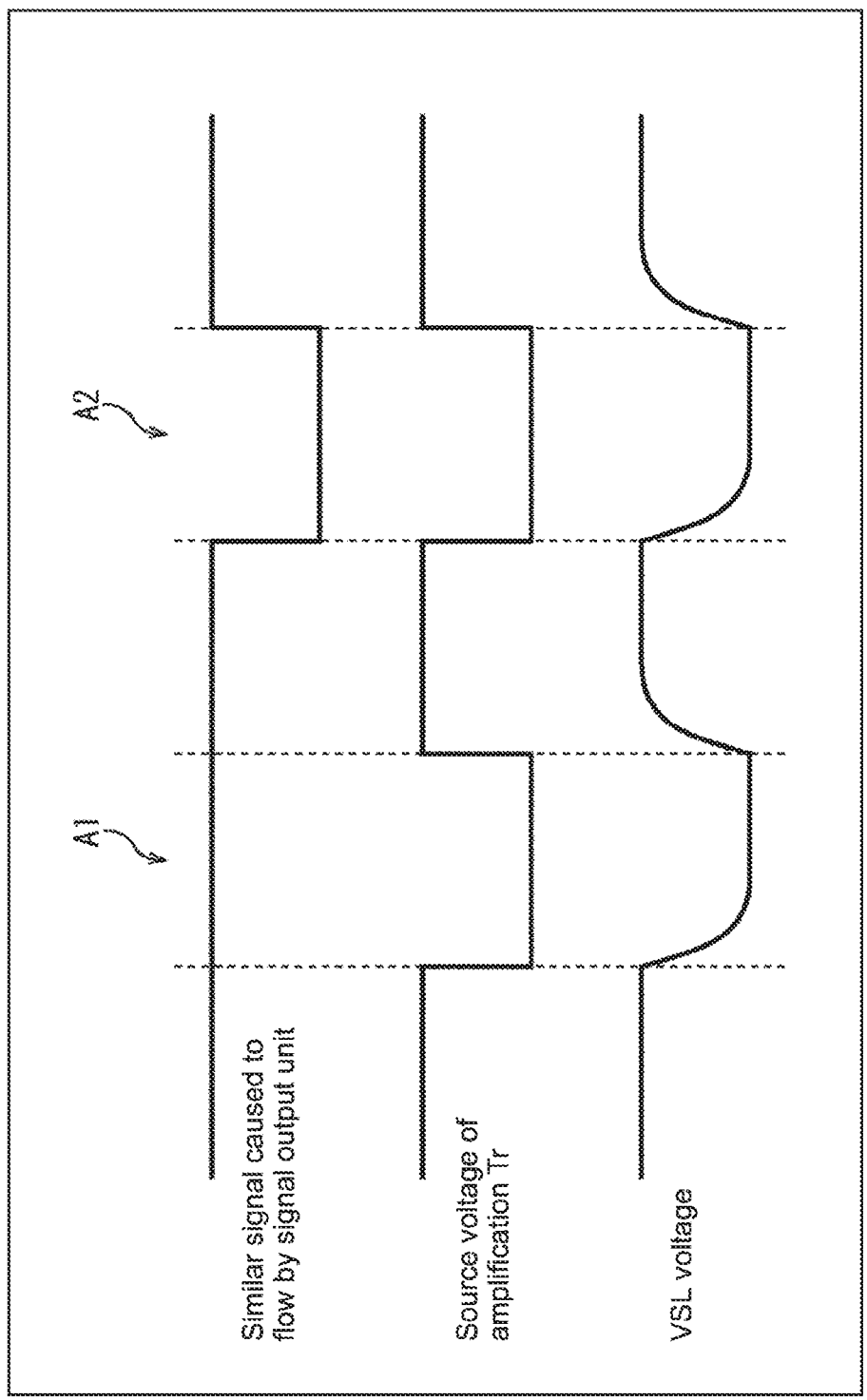
FIG. 6 A waveform diagram describing an operation example of the image sensor 2.

FIG. 6 is a waveform diagram describing an operation example of the image sensor 2 in FIG. 5.

FIG. 6 shows examples of the (similar) signal caused to flow through the assist VSL $61_n$ by the signal output unit 81, the source voltage of the amplification Tr 55, and the VSL voltage of the VSL $42_n$ (VSL signal that flows through the VSL 42) in a case A1 where the signal output unit 81 does not function and a case A2 where the signal output unit 81 functions.

In the case A1 where the signal output unit 81 does not function in FIG. 6, a signal similar to the VSL signal that flows through the VSL $42_n$ (similar signal) does not flow through the assist VSL $61_n$ when the source voltage of the amplification Tr 55 is changed.

For that reason, the slew rate of the VSL voltage of the VSL $42_n$ is reduced and the setting time of the VSL voltage is prolonged by adverse effects of the parasitic capacitance 71 of the VSL $42_n$.

On the other hand, in the case A2 where the signal output unit 81 functions, a signal similar to the VSL signal that flows through the VSL $42_n$ (similar signal) flows through the assist VSL $61_n$ when the source voltage of the amplification Tr 55 is changed.

As a result, adverse effects of the parasitic capacitance 71 of the VSL $42_n$ capacitively coupled to the assist VSL $61_n$ are reduced, and the reduction in slew rate of the VSL voltage of the VSL $42_n$ due to current flowing in the VSL $42_n$ from the parasitic capacitance 71 is reduced. Therefore, it is possible to reduce the degree to which shortening of the setting time of the VSL voltage is blocked.

<Third Configuration Example of Image Sensor 2>

Figure 7:
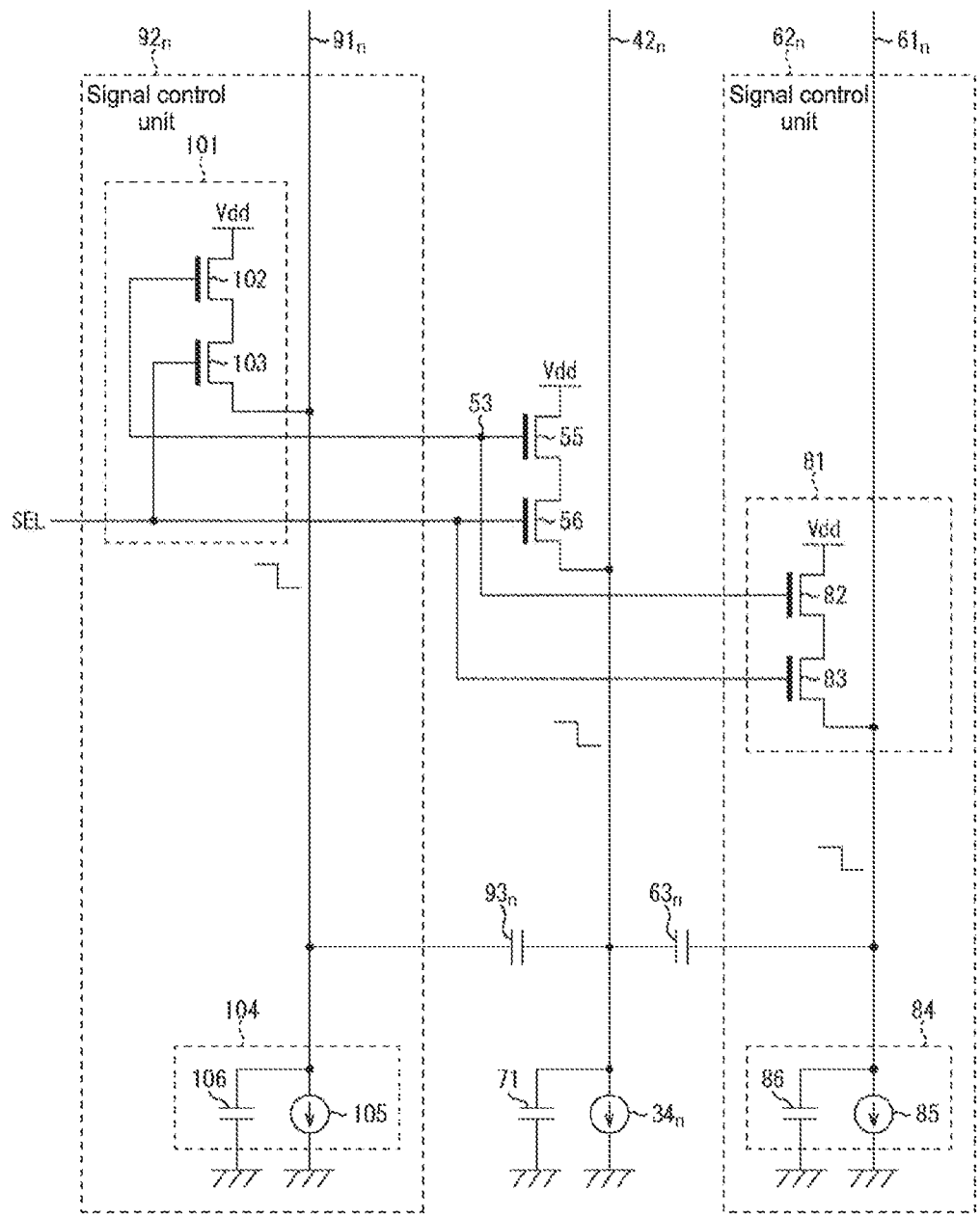
FIG. 7 A circuit diagram showing details of a third configuration example of the image sensor 2.

FIG. 7 is a circuit diagram showing details of a third configuration example of the image sensor 2.

Note that in FIG. 7, a part of the image sensor 2 is shown, similarly to FIG. 5.

Further, in FIG. 7, the components corresponding to those in FIG. 5 will be denoted by the same reference symbols and a description thereof will be appropriately omitted in the following.

The image sensor 2 in FIG. 7 is the same as that in FIG. 5 in that the image sensor 2 includes the current source $34_n$, the VSL $42_n$, the FD 53, the amplification Tr 55, the selection Tr 56, the assist VSL $61_n$, the signal control unit $62_n$, the capacitance $63_n$, and the capacitance 71.

It should be noted that the image sensor 2 in FIG. 7 is different from that in FIG. 5 in that the image sensor 2 includes an assist VSL $91_n$, a signal control unit $92_n$, and a capacitance $93_n$.

Specifically, while the assist VSL $61_n$ is placed only on the right side of the VSL $42_n$ in FIG. 5, the assist VSL $61_n$ is placed on the right side of the VSL $42_n$ and the assist VSL $91_n$ is placed on the left side of the VSL $42_n$ in FIG. 7.

The assist VSL $91_n$ is adjacent to the VSL $42_n$ (without sandwiching a conductor therebetween), is an assist signal line placed along the VSL $42_n$, and is capacitively coupled to the VSL $42_n$ by the capacitance $93_n$, similarly to the assist VSL $61_n$.

The assist VSLs $61_n$ and $91_n$ are different from each other in that the assist VSL $61_n$ is placed on the right side of the VSL $42_n$ and the assist VSL $91_n$ is placed on the left side of the VSL $42_n$.

The signal control unit $92_n$ performs signal control for causing a similar signal to flow through the assist VSL $91_n$, similarly to the signal control unit $62_n$. The similar signal has a similarity to the VSL signal that flows through the VSL $42_n$.

Specifically, the signal control unit $92_n$ includes a signal output unit 101 and a load unit 104.

The signal output unit 101 is configured similarly to the signal output unit 81, and the load unit 104 is configured similarly to the load unit 84.

Specifically, the signal processing unit 101 includes FETs 102 and 103 similar to the FETs 82 and 83, respectively. The FETs 102 and 103 respectively operate similarly to the amplification Tr 55 and the selection Tr 56.

The load unit 104 includes a current source 105 and a capacitance 106 similar to the current source 85 and the capacitance 86, respectively.

Therefore, the current source 105 causes constant current to flow through the assist VSL $91_n$ similarly to the current source 85. Further, the current source 105 constitutes an SF with the FET 103, and is a load of the SF, similarly to the current source 85.

Further, the capacitance 106 is a parasitic capacitance of the assist VSL $91_n$.

In the image sensor 2 configured as described above, the FETs 82 and 83 operate similarly to the amplification Tr 55 and the selection Tr 56, and the FETs 102 and 103 operate similarly to the amplification Tr 55 and the selection Tr 56.

Therefore, signals similar to the VSL signal that flow through the VSL $42_n$ flow through the assist VSL $61_n$ capacitively coupled to the VSL $42_n$ by the capacitance $63_n$ and the assist VSL $91_n$ capacitively coupled to the VSL $42_n$ by the capacitance $93_n$.

As a result, (adverse) effects of a parasitic capacitance 71 of the VSL $42_n$ are further reduced, and it is possible to further reduce the degree to which shortening of the setting time of the VSL voltage of the VSL $42_n$ due to current flowing in the VSL $42_n$ from the parasitic capacitance 71 of the VSL $42_n$ is blocked.

Note that although the assist VSL $61_n$ is provided on the right side of the VSL $42_n$ and the assist VSL 91, is provided on the left side of the VSL $41_n$ in FIG. 7, it is possible to further provide an assist VSL similar to the assist VSL $61_n$ so that the assist VSL is adjacent to the VSL $42_n$ in front or on a back side of the figure.

<Fourth Configuration Example of Image Sensor 2>

Figure 8:
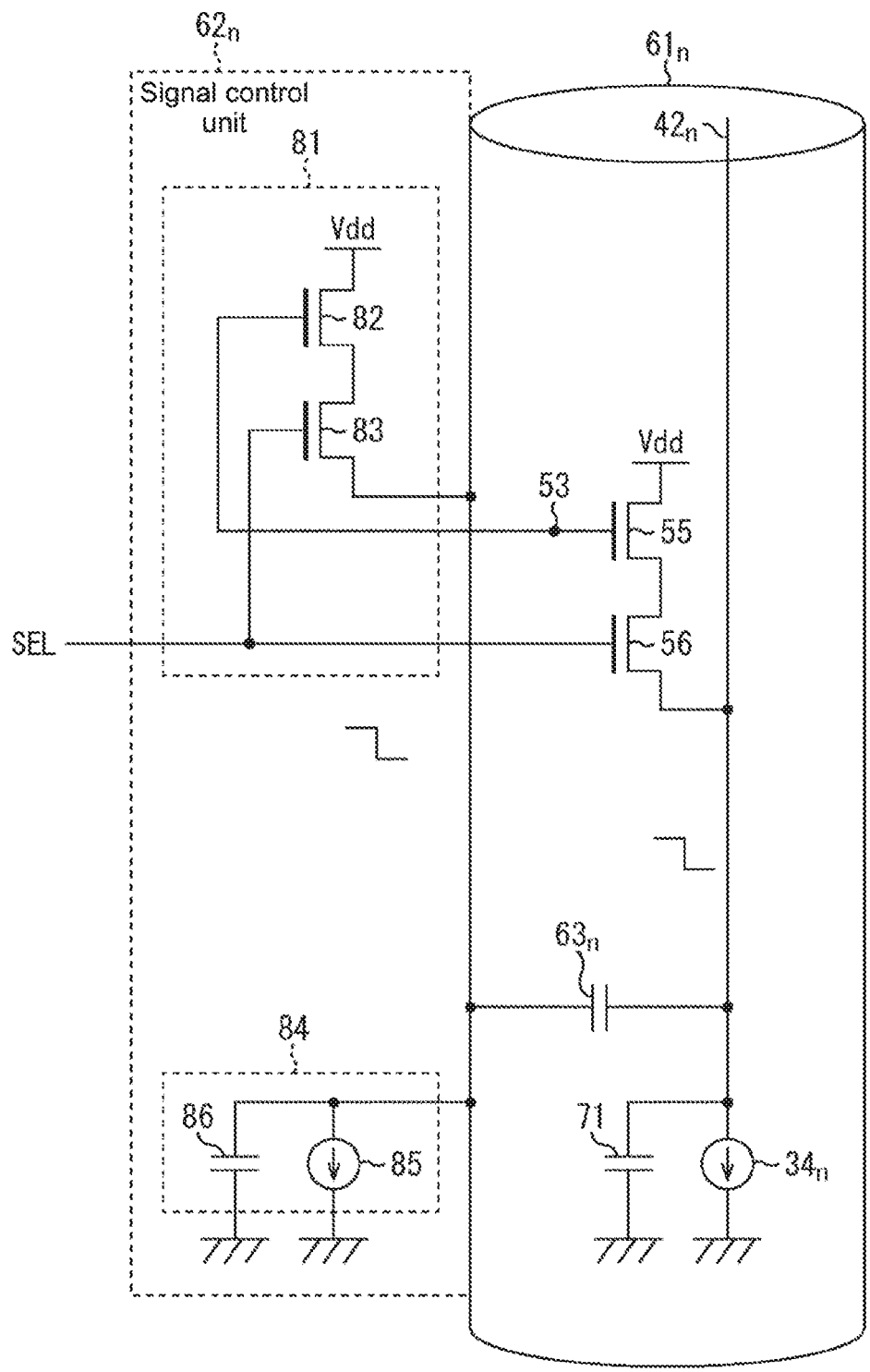
FIG. 8 A circuit diagram showing details of a fourth configuration example of the image sensor 2.

FIG. 8 is a circuit diagram showing details of a fourth configuration example of the image sensor 2.

Note that in FIG. 8, a part of the image sensor 2 is shown similarly to FIG. 5.

Further, in FIG. 8, the components corresponding to those in FIG. 5 will be denoted by the same reference symbols and a description thereof will be appropriately omitted in the following.

The image sensor 2 in FIG. 8 is the same as that in FIG. 5 in that the images sensor 2 includes the current source 34, the VSL $42_n$, the FD 53, the amplification Tr 55, the selection Tr 56, the assist VSL $61_n$, the signal control unit $62_n$, the capacitance $63_n$, and the capacitance 71.

It should be noted that the image sensor 2 in FIG. 8 is different from that in FIG. 5 in that the assist VSL $61_n$ is formed of a cylindrical conductor and placed so as to surround the VSL $41_n$. In FIG. 5, the assist VSL 61, is formed of a linear conductor.

In the image sensor 2 configured as described above, the FETs 82 and 83 operate similarly to the amplification Tr 55 and the selection Tr 56, and similar signals flow through the VSL $42_n$ and the assist VSL $61_n$ capacitively coupled to each other by the capacitance $63_n$, similarly to the case of FIG. 5.

As a result, (adverse) effects of the parasitic capacitance 71 of the VSL $42_n$ are reduced, and it is possible to reduce the degree to which shortening of the setting time of the VSL voltage of the VSL $42_n$ due to current flowing in the VSL $42_n$ from the parasitic capacitance 71 of the VSL $42_n$ is blocked.

Note that in FIG. 8, the assist VSL $61_n$ is placed so as to surround the VSL $41_n$ and therefore, the entire vicinity of the VSL $42_n$ is shielded in a manner by the assist VSL $61_n$. Accordingly, it is possible to further reduce (adverse) effects of the parasitic capacitance 71 of the VSL $42_n$ as compared with the case of FIG. 5 or FIG. 7.

<Fifth Configuration Example of Image Sensor 2>

Figure 9:
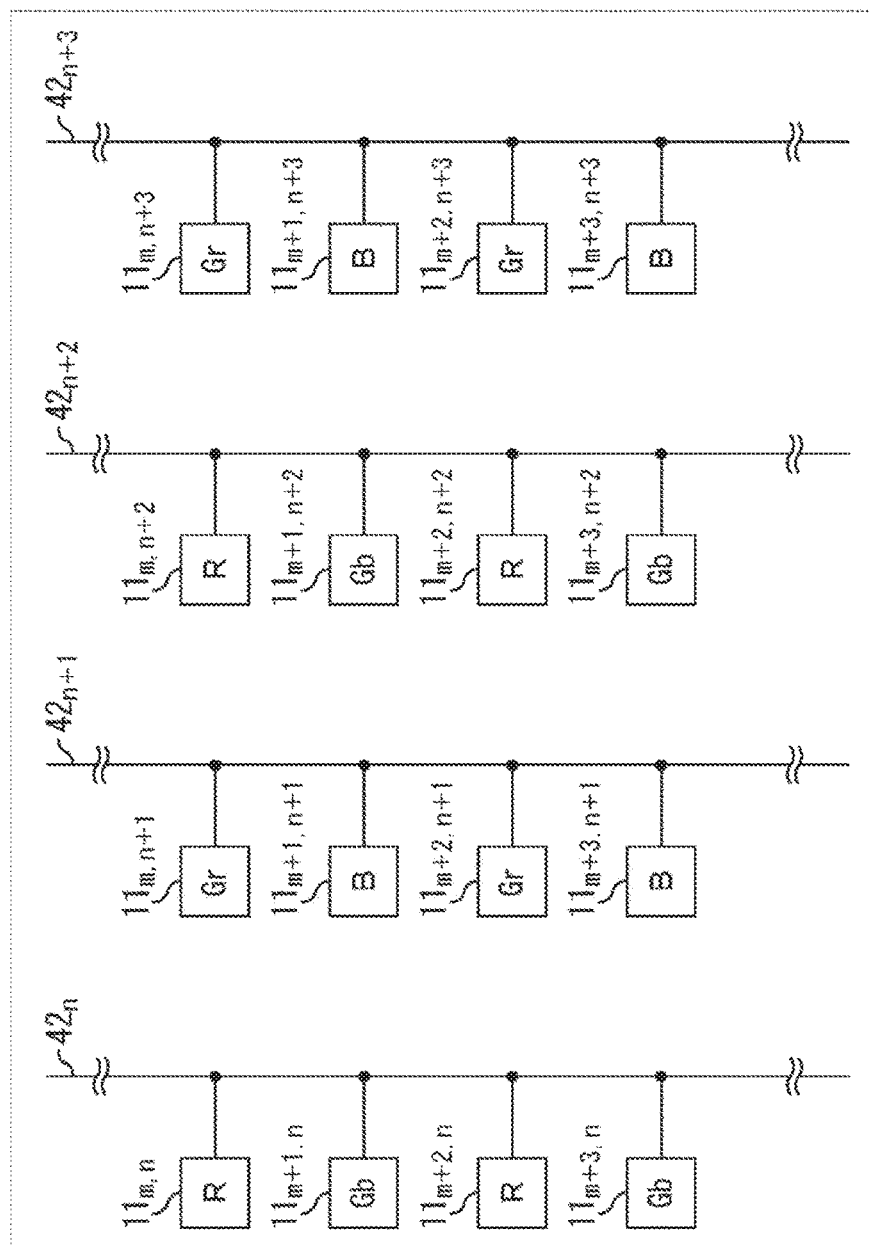
FIG. 9 A block diagram showing a fifth configuration example of the image sensor 2.

FIG. 9 is a block diagram showing a fifth configuration example of the image sensor 2.

Note that in FIG. 9, only the pixels $11_{m,n}$ to $11_{m+3,n+3}$ of the pixel unit 10 in 4 rows×4 columns and four VSLs $42_n$ to $42_{n+3}$ for the pixels $11_{m,n}$ to $11_{m+3,n+3}$ of the pixel unit 10 in 4 rows×4 columns are shown. Illustration of another part is omitted.

Further, in FIG. 9, the components corresponding to those in FIG. 2 will be denoted by the same reference symbols and a description thereof will be appropriately omitted in the following.

In FIG. 9, four pixels $11_{m,n}$ to $11_{m+1,n+1}$ in 2 rows×2 columns are an arrangement unit in a Bayer pattern. The arrangement unit is arranged in horizontal and vertical directions. Other than that, the image sensor 2 in FIG. 9 is the same as that in FIG. 2.

In the arrangement unit, the upper left pixel $11_{m,n}$ receives red light incident via a color filter (not shown), and outputs a signal having a red (R (Red)) pixel value. The upper right pixel $11_{m,n+1}$ and the lower left pixel $11_{m+1,n}$ each receive green light incident via a color filter (not shown), and output a signal having a green (G (Green)) pixel value. The lower right pixel $11_{m+1,n+1}$ receives blue light incident via a color filter (not shown), and outputs a signal having a blue (B (Blue)) pixel value.

Note that in FIG. 9, R represents the upper left pixel $11_{m,n}$ that outputs an R signal having a red pixel value in the arrangement unit, and Gr represents the upper right pixel $11_{m,n+1}$ that outputs a Gr signal having a green pixel value in the arrangement unit. Further, Gb represents the lower left pixel $11_{m+1,n}$ that outputs a Gb signal having a green pixel value in the arrangement unit, and B represents the lower right pixel $11_{m+1,n+1}$ that outputs a B signal having a blue pixel value in the arrangement unit.

In the image sensor 2 configured as described above, as shown in FIG. 2, the vertical scanning unit 21 sequentially drives N pixels $11_{m,1}$ to $11_{m,N}$ in each row of the first to M-th rows of the pixel unit 10 from the first row, and outputs signals from the pixels $11_{m,1}$ to $11_{m,N}$ to the VSLs $42_1$ to $42_N$ row by row.

Therefore, in FIG. 9, N pixels values of the R signal, the Gr signal, the R signal, and the Gr signal, . . . , in the m-th row are read, and N pixel values of the Gb signal, the B signal, the Gb signal, and the B signal, . . . , in the m+1-th (next) row are read. Similarly, pixels values are read row by row.

In FIG. 9, there is no assist signal line that is adjacent to the VSL $42_n$ and placed along the VSL $42_n$ like the assist VSL $61_n$. Therefore, adverse effects of the parasitic capacitance 71 of the VSL $42_n$ are not reduced, the slew rate of the VSL voltage of the VSL $42_n$ is reduced, and the setting time of the VSL voltage is prolonged.

<Sixth Configuration Example of image Sensor 2>

Figure 10:
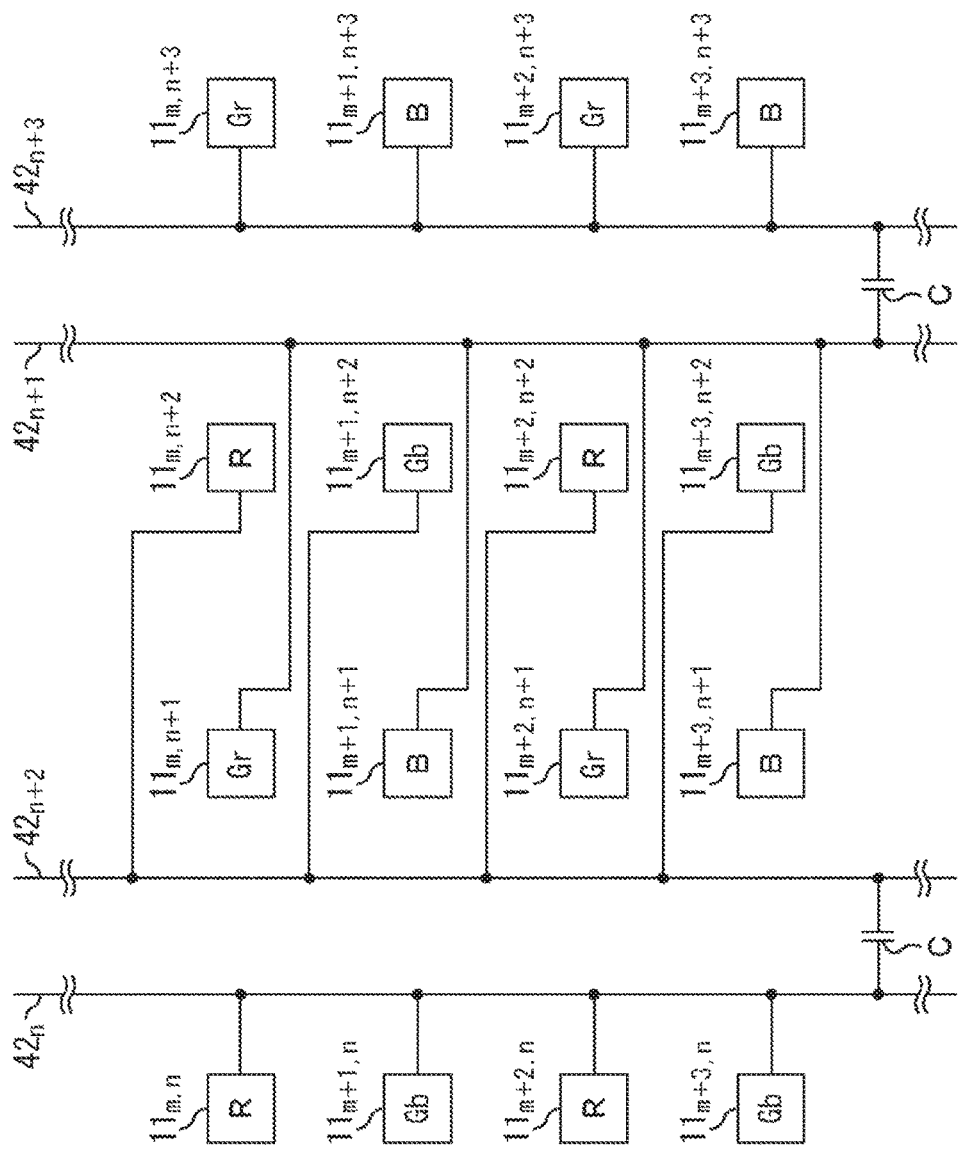
FIG. 10 A block diagram showing a sixth configuration example of the image sensor 2.

FIG. 10 is a block diagram showing a sixth configuration example of the image sensor 2.

Note that in FIG. 10, only the pixels $11_{m,n}$ to $11_{m+3,n+3}$ in 4 rows×4 columns of the pixel unit 10 and four VSLs $42_n$ to $42_{n+3}$ for the pixels $11_{m,n}$ to $11_{m+3,n+3}$ in 4 rows×4 columns of the pixel unit 10 are shown, similarly to FIG. 9. Illustration of another part is omitted.

Further, in FIG. 10, the components corresponding to those in FIG. 9 will be denoted by the same reference symbols and a description thereof will be appropriately omitted in the following.

In FIG. 10, four pixels $11_{m,n}$ to $11_{m+1,n+1}$ in 2 rows×2 columns are an arrangement unit in a Bayer pattern, similarly to FIG. 9. The arrangement unit is arranged in horizontal and vertical directions. In this point, the image sensor 2 in FIG. 10 is the same as that in FIG. 9.

It should be noted that the image sensor 2 in FIG. 10 is different from that in FIG. 9 in that when pixels $11_{1,n}$ to $11_{M,n}$ in one column (n-th column) are focused on, the VSL $42_n$ for the focused pixel column of the focused pixels $11_{1,n}$ to $11_{M,n}$ and the VSL $42_{n+2}$ for a pixel column placed to the left by two columns from the focused pixel column or the VSL $42_{n+2}$ for a pixel column placed to the right by two columns from the focused pixel column are adjacent to each other.

Note that in the following, regarding the VSL $42_n$ for the focused pixel column, the VSL $42_{n+2}$ for the pixel column placed to the right by two columns from the focused pixel column will be discussed to simplify the description.

The image sensor 2 in FIG. 10 is different from that in FIG. 9 in that the VSL $42_n$ for the focused pixel column and the VSL $42_{n+2}$ for the pixel column placed to the right by two columns from the focused pixel column are capacitively coupled to each other by a capacitance C.

Note that the capacitance C may be a parasitic capacitance between the VSL $42_n$ and the VSL $42_{n+2}$ or an actual capacitance, similarly to the capacitance $63_n$ in FIG. 4.

Further, the focused pixel column is referred to also as first focused pixel column and the pixel column placed to the right by two columns from the focused pixel column is referred to also as second focused pixel column as appropriate in the following.

In the image sensor 2 in FIG. 10 configured as described above, signals of the same color (pixel value) are output from pixels in the same row in the first focused pixel column and the second focused pixel column Further, because the first focused pixel column and the second focused pixel column are apart from each other only by two columns, signals of the same color output from pixels in the same row in the first focused pixel column and the second focused pixel column are (substantially) similar to each other.

Further, in FIG. 10, the VSL $42_n$ for the first focused pixel column and the VSL $42_{n+2}$ for the second focused pixel column are placed to be adjacent to each other, and any of them are VSLs. Therefore, the VSLs $42_n$ and $42_{n+1}$ are respectively placed along the VSL $42_{n+2}$ and $42_n$.

Then, the VSLs $42_n$ and $42_{n+2}$ are capacitively coupled to each other by the capacitance C.

Through the VSLs $42_n$ and $42_{n+2}$ capacitively coupled to each other by the capacitance C as described above, similar signals flow. As a result, (adverse) effects of the parasitic capacitance of the VSL $42_n$ and the parasitic capacitance of the VSL $42_{n+2}$ are reduced, and it is possible to reduce the degree to which shortening of the setting time of the VSL voltage of the VSLs $42_n$ and $42_{n+2}$, respectively, due to current flowing in the VSL $42_n$ from the parasitic capacitance of the VSL $42_n$ and current flowing in the VSL $42_n$ from the parasitic capacitance of the VSL $42_{n+2}$ is blocked.

Specifically, for the VSL $42_n$, the VSL $42_{n+2}$ as another VSL is an assist signal line that is adjacent to the VSL $42_n$ and placed alone the VSL $42_n$.

Then, since signals of the same color are output from pixels in the same row in the first focused pixel column and the second focused pixel column, it can be said that the pixel in the second focused pixel column causes the similar signal to flow through the VSL $42_{n+2}$. The similar signal has a similarity to the VSL signal that is caused to flow through the VSL $42_n$ by the pixel in the first focused pixel column. Therefore, for the first focused pixel column, the pixel in the second focused pixel column functions as the signal control unit that performs signal control for causing the similar signal having a similarity to the signal that flows through the VSL $42_n$ to flow through the VSL $42_{n+2}$ as the assist signal line.

On the other hand, for the VSL $42_{n+2}$, the VSL $42_n$ as another VSL is an assist signal line that is adjacent to the VSL $42_{n+2}$ and placed along the VSL $42_{n+2}$.

Then, since signals of the same color are output from the pixels in the same row in the first focused pixel column and the second focused pixel column, it can be said that the pixel in the first focused pixel column causes the similar signal to flow through the VSL $42_n$. The similar signal has a similarity to the VSL signal caused to flow through the VSL $42_{n+2}$ by the pixel in the second focused pixel column. Therefore, for the second focused pixel column, the pixel in the first focused pixel column functions as the signal control unit that performs signal control for causing the similar signal having a similarity to the signal that flows through the VSL $42_{n+2}$ to flow through the VSL $42_n$ as the assist signal line.

In the case where for the VSL $42_n$, the VSL $42_{n+2}$ is used as the assist signal line that is adjacent to the VSL $42_n$ and placed along the VSL $42_n$ as described above, for example, it is possible to prevent the image sensor 2 from being increased in size as compared with the case of FIG. 5, FIG. 7, or the like where the assist VSL $61_n$ or $91_n$ as an assist signal line is provided separately from the VSLs $42_1$ to $42_N$.

Note that the image sensor 2 is applicable to not only a digital camera but also a portable terminal that includes an image sensor and has a function of taking an image, such as a smartphone, and any other electronic apparatuses having a function of taking an image.

<First Embodiment of Signal Transmission System to which Present Technology is Applied>

Figure 11:
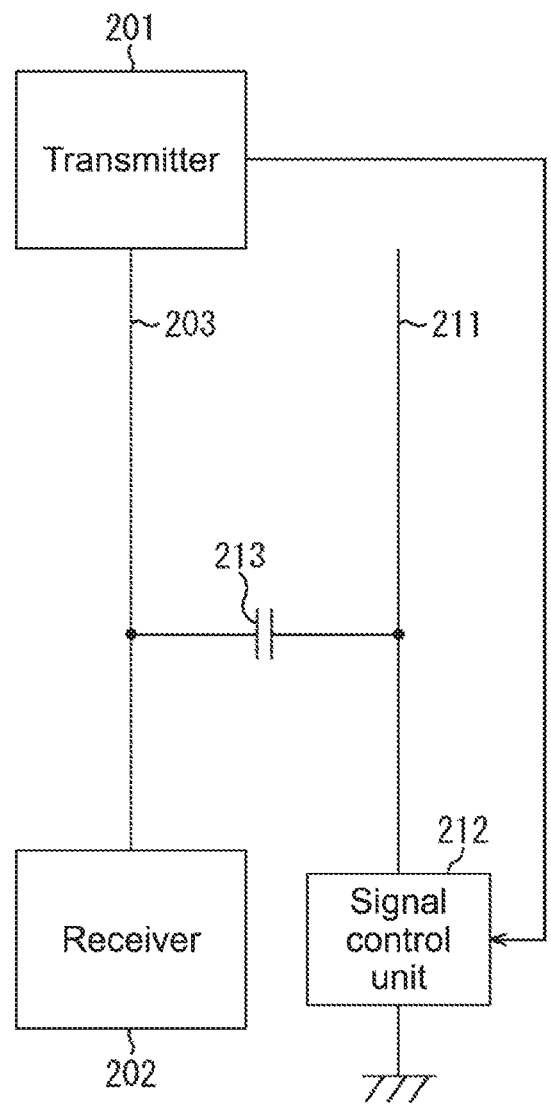
FIG. 11 A block diagram showing a configuration example of a first embodiment of a signal transmission system to which the present technology is applied.

FIG. 11 is a block diagram showing a configuration example of a first embodiment of a signal transmission system to which the present technology is applied.

As described above, it is possible to easily reduce adverse effects of the parasitic capacitance of the VSL $42_n$ by placing an assist signal line adjacent to the VSL $42_n$ along the VSL $42_n$, capacitively coupling the assist signal line to the VSL $41_n$, and causing a similar signal having a similarity to the VSL signal that flows through the VSL $42_n$ to flow through the assist signal line.

As described above, the method of reducing adverse effects of a parasitic capacitance is applicable not only to the image sensor 2 but also to the signal transmission system in which a signal is transmitted via a wired transmission path.

FIG. 11 shows a configuration example of the first embodiment of such signal transmission system.

In FIG. 11, the signal transmission system includes a transmitter 201, a receiver 202, a signal transmission path 203, an assist transmission path 211, a signal control unit 212, and a capacitance 213.

The transmitter 201 outputs a transmission signal suitable for being transmitted through the signal transmission path 203 to the signal transmission path 203, for example. Accordingly, the transmitter 201 sends (transmits) the transmission signal via the signal transmission path 203.

The receiver 202 receives the transmission signal that is sent from the transmitter 202 and flows through the signal transmission path 203.

The signal transmission path 203 is a wired transmission path, and the transmission signal output from the transmitter 201 flows through the signal transmission path 203.

The assist transmission path 211 is a wired transmission path that is adjacent to the signal transmission path 203 and placed along the signal transmission path 203.

The signal control unit 212 monitors the transmitter 201, and performs signal control for causing a similar signal to flow through the assist transmission path 211. The similar signal has a similarity to the transmission signal that is output to the signal transmission path 203 by the transmitter 201.

The capacitance 213 is a capacitance that capacitively couples the signal transmission path 203 and the assist transmission path 211 to each other. The capacitance 213 may be a parasitic capacitance between the signal transmission path 203 and the assist transmission path 211, or an actual capacitance.

In the signal transmission system configured as described above, the signal control unit 212 monitors the transmitter 201, and the transmitter 201 causes the similar signal having a similarity to the transmission signal that is caused to flow through the signal transmission path 203 to flow through the assist transmission path 211 capacitively coupled to the signal transmission path 203 by the capacitance 213.

As a result, regarding the signal transmission path 203 and the assist transmission path 211, (adverse) effects of the parasitic capacitance of the signal transmission path 203 are easily reduced by the equal potential without feedback of a signal, and it is possible to suppress the deterioration of the quality of the transmission signal that flows through the signal transmission path 203 due to the parasitic capacitance of the signal transmission path 203.

Figure 12:
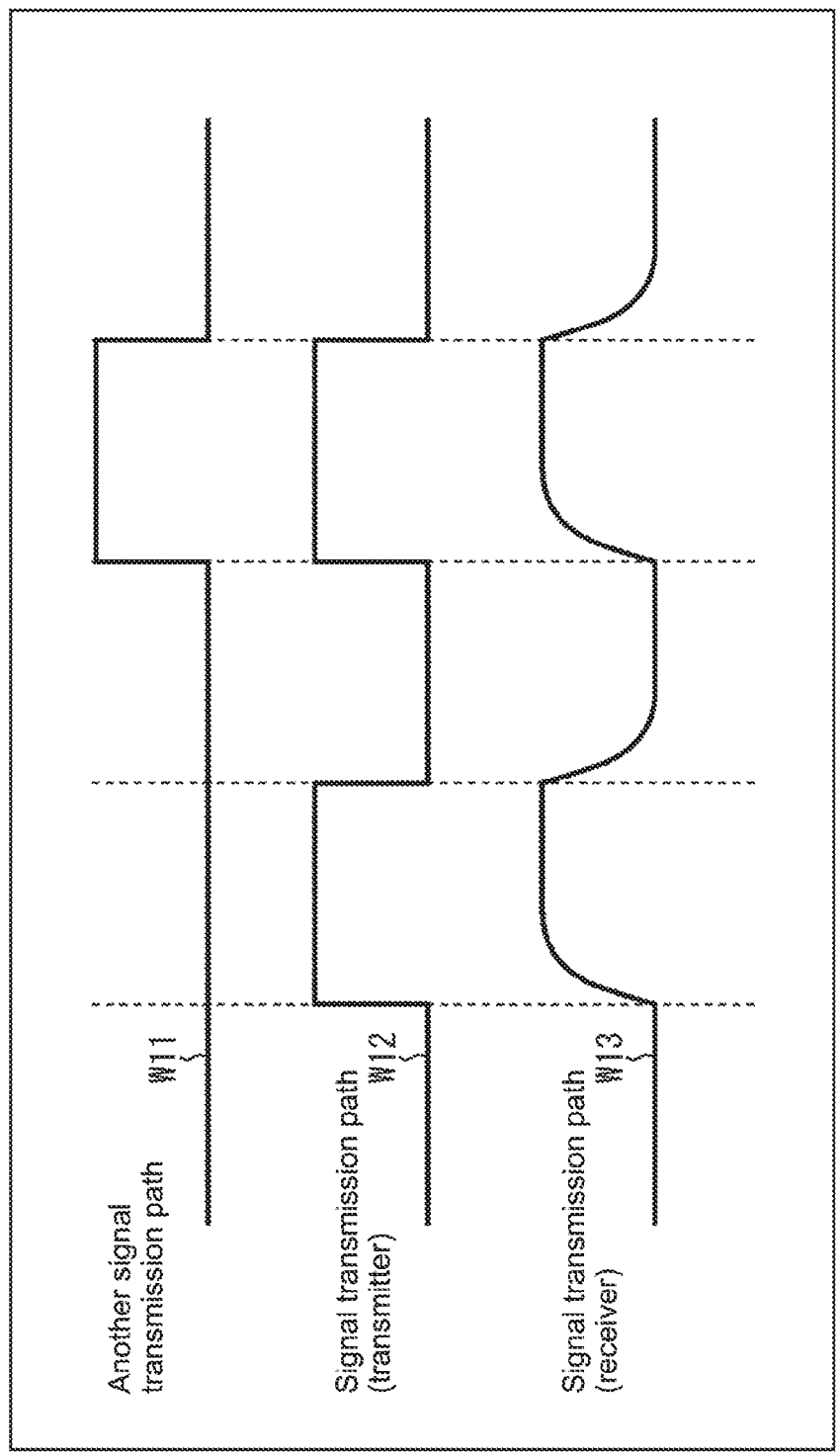
FIG. 12 A waveform diagram describing a first example of an operation of the signal transmission system.

FIG. 12 is a waveform diagram describing a first example of an operation of the signal transmission system in FIG. 11.

Specifically, FIG. 12 shows an operation example of the signal transmission system in the case where the signal control unit 212 is prevented from functioning.

In FIG. 12, examples of the waveform of a signal W11 that flows through another signal transmission path that is not capacitively coupled to the signal transmission path 203, the waveform of a transmission signal W12 that is output to the signal transmission path 203 by the transmitter 201, and the waveform of a reception signal W13 acquired by receiving the transmission signal W12 that flows through the signal transmission path 203 by the receiver 202 are shown.

In FIG. 12, the transmission signal W12 that flows through the signal transmission path 203 is affected by the parasitic capacitance of the signal transmission path 203 regardless of the signal W11 that flows through another signal transmission path. As a result, the reception signal W13 is a signal whose quality is significantly deteriorated (slew rate is significantly reduced) as compared with the transmission signal W12.

Figure 13:
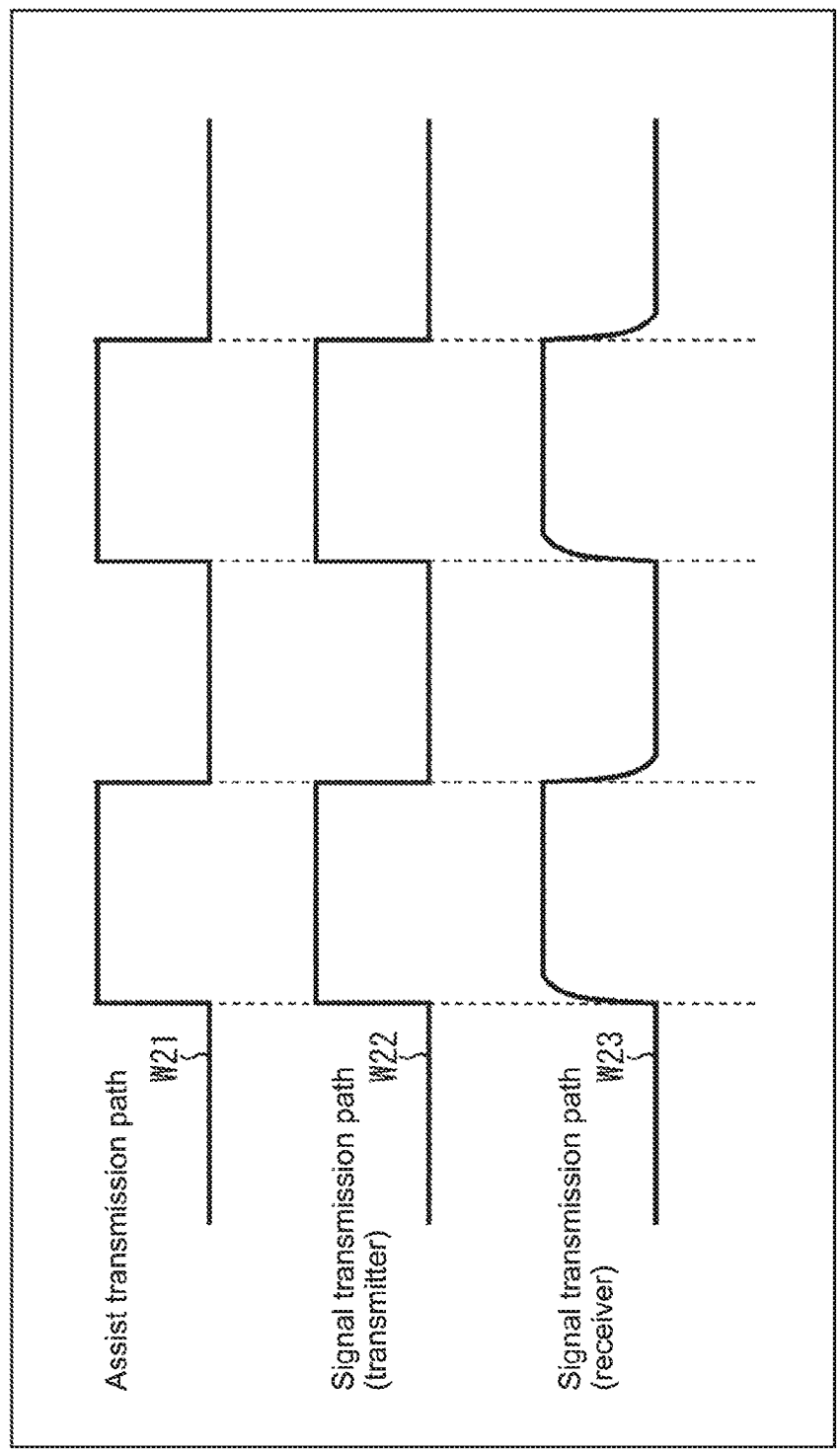
FIG. 13 A waveform diagram describing a second example of as operation of the signal transmission system.

FIG. 13 is a waveform diagram describing a second example of an operation of the signal transmission system in FIG. 11.

Specifically, FIG. 13 shows an operation example of the signal transmission system in the case where the signal control unit 212 is caused to function.

In FIG. 13, examples of the waveform of a similar signal W21 that flows through the assist transmission path 211 capacitively coupled to the signal transmission path 203 by the capacitance 213, the waveform of a transmission signal W22 that is output to the signal transmission path 203 by the transmitter 201, and the waveform of a reception signal W23 acquired by receiving the transmission signal W22 that flows through the signal transmission path 203 by the receiver 202 are shown.

In FIG. 13, the similar signal W21 having a similarity to the transmission signal W22 that flows through the signal transmission path 203 flows through the assist transmission path 211 capacitively coupled to the signal transmission path 203 by the capacitance 213. Accordingly, effects of the parasitic capacitance of the signal transmission path 203 are reduced.

As a result, the reception signal W23 is a signal in which deterioration of the signal quality is suppressed, i.e., the slew rate is prevented from being reduced, for example, as compared with the reception signal W13 in FIG. 12.

<Second Embodiment of Signal Transmission System>

Figure 14:
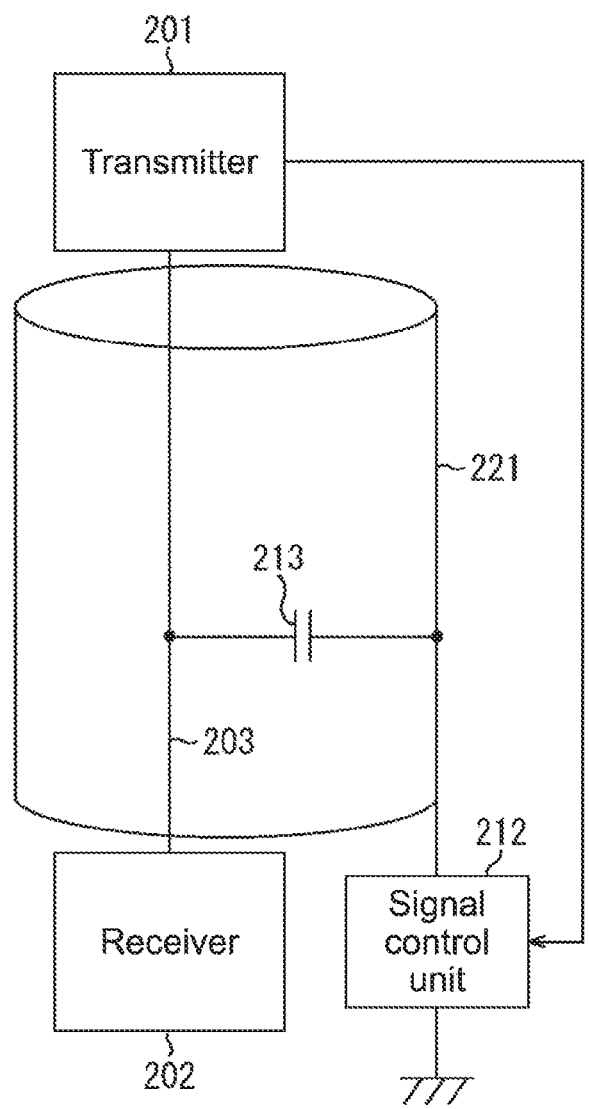
FIG. 14 A block diagram showing a configuration example of a second embodiment of the signal transmission system to which the present technology is applied.

FIG. 14 is a block diagram showing a configuration example of a second embodiment of the signal transmission system to which the present technology is applied.

Note that in FIG. 14, the components corresponding to those in FIG. 11 will be denoted by the same reference symbols and a description thereof will be appropriately omitted is the following.

The signal transmission system in FIG. 14 is the same as that in FIG. 11 in that the signal transmission system includes the transmitter 201, the receiver 202, the signal transmission path 203, the signal control unit 212, and the capacitance 213.

It should be noted that the signal transmission system in FIG. 14 is different from that in FIG. 11 in that an assist transmission path 221 is provided instead of the assist transmission path 211.

The assist transmission path 211 in FIG. 11 is a linear conductor (transmission path). The assist transmission path 221 in FIG. 14 is different from that in FIG. 11 in that the assist transmission path 221 is a cylindrical conductor and placed so as to surround the signal transmission path 203.

In the signal transmission system configured as described above, similar signals flow through the signal transmission path 203 and the assist transmission path 221 capacitively coupled to each other by the capacitance 213, similarly to the case of FIG. 11.

As a result, (adverse) effects of the parasitic capacitance of the signal transmission path 203 are reduced, and it is possible to suppress deterioration of the quality of the transmission signal received by the receiver 202 via the signal transmission path 203 due to the parasitic capacitance of the signal transmission path 203.

<Third Embodiment of Signal Transmission System>

Figure 15:
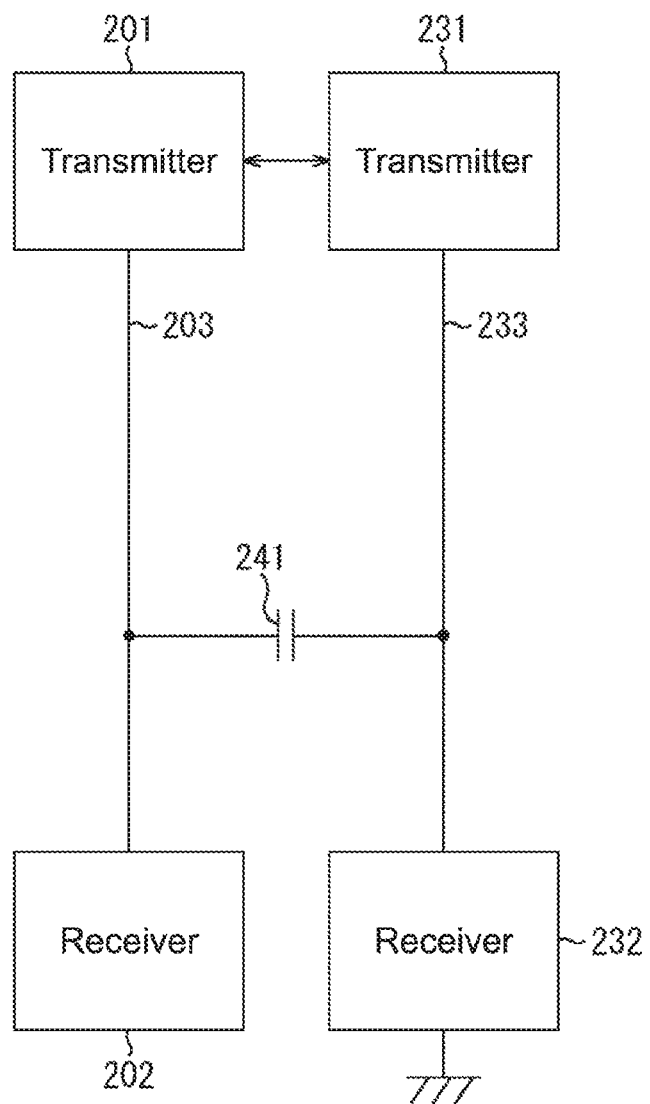
FIG. 15 A block diagram showing a configuration example of a third embodiment of the signal transmission system to which the present technology is applied.

FIG. 15 is a block diagram showing a configuration example of a third embodiment of the signal transmission system to which the present technology is applied.

Note that in FIG. 15, the components corresponding to those in FIG. 11 will be denoted by the same reference symbols and a description thereof will be appropriately omitted in the following.

The signal transmission system in FIG. 15 is the same as that in FIG. 11 in that the signal transmission system includes the transmitter 201, the receiver 202, and the signal transmission path 203.

It should be noted that the signal transmission system in FIG. 15 is different from that in FIG. 11 is that the assist transmission path 211, the signal control unit 212, and the capacitance 213 are not provided, and the signal transmission system includes a transmitter 231, a receiver 232, a signal transmission path 233, and a capacitance 241.

The transmitter 231, the receiver 232, and the signal transmission path 233 are respectively configured similarly to the transmitter 201, the receiver 202, and the signal transmission path 203.

Therefore, the transmitter 231 outputs a transmission signal to the signal transmission path 233. Accordingly, the transmitter 231 sends (transmits) the transmission signal via the signal transmission path 233.

Then, the receiver 232 receives the transmission signal that is sent from the transmitter 232 and flows through the signal transmission path 233.

Note that the signal transmission paths 203 and 233 are adjacent to each other and respectively placed along the signal transmission paths 233 and 230.

The capacitance 241 is a capacitance that capacitively couples the signal transmission paths 203 and 233 to each other. The capacitance 213 may be a parasitic capacitance between the signal transmission paths 203 and 233, or an actual capacitance.

In the signal transmission system configured as described above, the transmitters 201 and 231 output similar signals having a similarity to each other such as the same signal as the transmission signal.

Therefore, similar signals flow through the signal transmission paths 203 and 233 capacitively coupled to each other by the capacitance 241. As a result, (adverse) effects of the parasitic capacitance of the signal transmission path 203 and the parasitic capacitance of the signal transmission path 233 are reduced, and it is possible to suppress deterioration of the quality of the transmission signal received by the receiver 202 via the signal transmission path 203 due to the parasitic capacitance of the signal transmission path 203, and deterioration of the quality of the transmission signal received by the receiver 232 via the signal transmission path 233 due to the parasitic capacitance of the signal transmission path 233.

Note that regarding the signal transmission path 203, the signal transmission path 233 being another signal transmission path is an assist transmission path that is adjacent to the signal transmission path 203 and placed along the signal transmission path 203.

Then, since the same transmission signals are output from the transmitter 201 and the transmitter 231, for example, it can be said that the transmitter 231 causes a similar signal to flow through the signal transmission path 233. The similar signal has a similarity to the transmission signal that is caused to flow through the signal transmission path 203 by the transmitter 201. Therefore, for the transmitter 201, the transmitter 231 functions as the signal control unit that performs signal control for causing the similar signal having a similarity to the signal that flows through the signal transmission path 203 to flow through the signal transmission path 233 as an assist transmission path.

On the other hand, regarding the signal transmission path 233, the signal transmission path 203 being another signal transmission path is an assist transmission path that is adjacent to the signal transmission path 233 and placed along the signal transmission path 233.

Then, since the same transmission signals are output from the transmitter 201 and the transmitter 231, for example, it can be said that the transmitter 201 causes a similar signal to flow through the signal transmission path 203. The similar signal has a similarity to the transmission signal that is caused to flow through the signal transmission path 233 by the transmitter 231. Therefore, for the transmitter 231, the transmitter 201 functions as the signal control unit that performs signal control for causing the similar signal having a similarity to the signal that flows through the signal transmission path 233 to flow through the signal transmission path 203 as an assist transmission path.

Note that in FIG. 15, the transmitters 201 and 231 may be substituted with one transmitter. Also the receivers 202 and 232 may be substituted with one receiver.

<Fourth Embodiment of Signal Transmission System>

Figure 16:
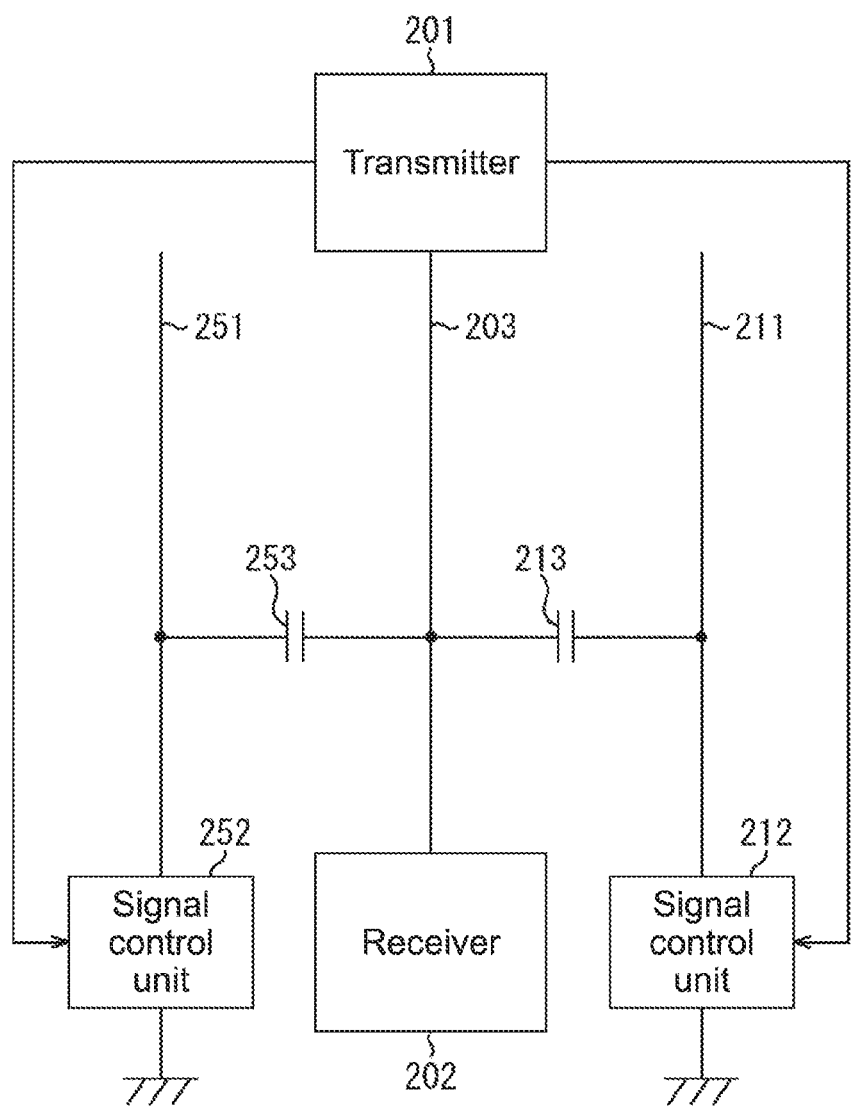
FIG. 16 A block diagram showing a configuration example of a fourth embodiment of the signal transmission system to which the present technology is applied.

FIG. 16 is a block diagram showing a configuration example of a fourth embodiment of the signal transmission system to which the present technology is applied.

Note that in FIG. 16, the components corresponding to those in FIG. 11 will be denoted by the same reference symbols and a description thereof will be appropriately omitted in the following.

The signal transmission system in FIG. 16 is the same as that in FIG. 11 in that the signal transmission system includes the transmitter 201, the receiver 202, the signal transmission path 203, the assist transmission path 211, the signal control unit 212, and the capacitance 213.

It should be noted that the signal transmission system in FIG. 16 is different from that in FIG. 11 in that the signal transmission system includes an assist transmission path 251, a signal control unit 252, and a capacitance 253.

The assist transmission path 251, the signal control unit 252, and the capacitance 253 are respectively configured similarly to the assist transmission path 211, the signal control unit 212, and the capacitance 213.

Specifically, the assist transmission path 251 is adjacent to the signal transmission path 203, and placed along the signal transmission path 203.

Note that while the assist transmission path 211 is placed to be adjacent to the signal transmission path 203 on the right in FIG. 16, the assist transmission path 251 placed to be adjacent to the signal transmission path 203 on the left.

The signal control unit 252 monitors the transmitter 201, and performs signal control for causing a similar signal to flow through the assist transmission path 251. The similar signal has a similarity to the transmission signal that is output to the signal transmission path 203 by the transmitter 201.

The capacitance 253 is a capacitance that capacitively couples the signal transmission path 203 and the assist transmission path 251 to each other. The capacitance 253 may be a parasitic capacitance between the signal transmission path 203 and the assist transmission path 251, or an actual capacitance.

In the signal transmission system configured as described above, signals similar to the transmission signal that flows through the signal transmission path 203 flow through the assist transmission path 211 capacitively coupled to the signal transmission path 203 by the capacitance 213 and the assist transmission path 251 capacitively coupled to the signal transmission path 203 by the capacitance 253

As a result, (adverse) effects of the parasitic capacitance of the signal transmission path. 203 are further reduced, and it is possible to suppress deterioration of the quality of the transmission signal received by the receiver 202 via the signal transmission path 203 due to the parasitic capacitance of the signal transmission path 203.

Note that although the assist transmission path 211 is provided on the right side of the signal transmission path 203 and the assist transmission path 251 is provided on the left side of the signal transmission path 203 in FIG. 16, it is possible to further provide an assist transmission path similar to the assist transmission path 211 so that the assist transmission path is adjacent to the signal transmission path 203 in front or on a back side of the figure.

<Fifth Embodiment of Signal Transmission System>

Figure 17:
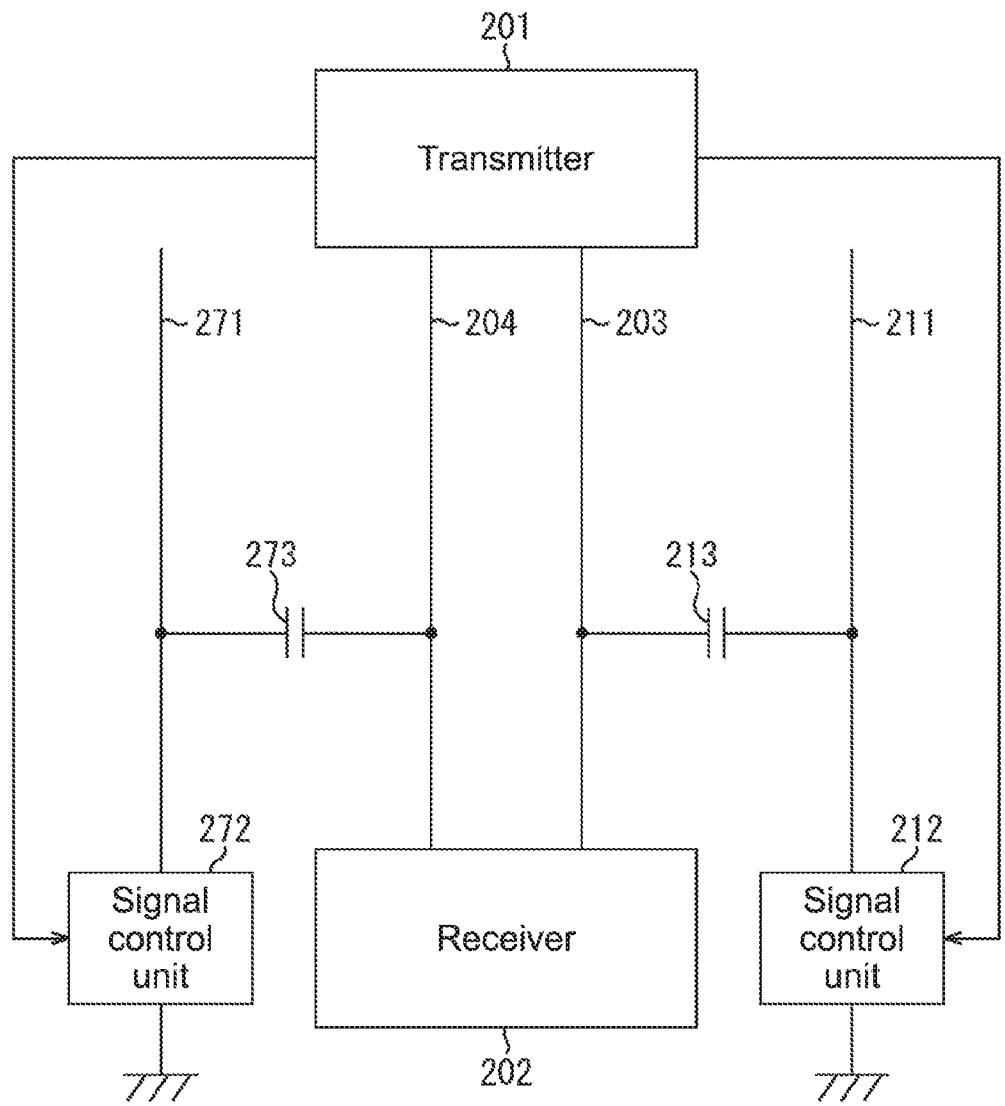
FIG. 17 A block diagram showing a configuration example of a fifth embodiment of the signal transmission system to which the present technology is applied.

FIG. 17 is a block diagram showing a configuration example of a fifth embodiment of the signal transmission system to which the present technology is applied.

Note that in FIG. 17, the components corresponding to those in FIG. 11 will be denoted by the same reference symbols and a description thereof will be appropriately omitted in the following.

The signal transmission system in FIG. 17 is the same as that in FIG. 11 in that the signal transmission system includes the transmitter 201, the receiver 202, the signal transmission path 203, the assist transmission path 211, the signal control unit 212, and the capacitance 213.

It should be noted that the signal transmission system in FIG. 17 is different from that in FIG. 11 in that the signal transmission system includes a signal transmission path 204, an assist transmission path 271, a signal control unit 272, and a capacitance 273.

The signal transmission path 204 is configured similarly to the signal transmission path 203. Through the signal transmission path 204, the transmission signal output from the transmitter 201 flows.

Note that in FIG. 17, the transmitter 201 is capable of sending the transmission signal to the receiver 202 via any of the signal transmission paths 203 and 204.

The transmission signal sent by the transmitter 201 via the signal transmission path 203 and the transmission signal sent by the transmitter 201 via the signal transmission path 204 may be the same or different from each other.

The assist transmission path 271, the signal control unit 272, and the capacitance 273 are respectively configured similarly to the assist transmission path 211, the signal control unit 212, and the capacitance 213.

Specifically, the assist transmission path 271 is adjacent to the signal transmission path 204, and placed along the signal transmission path 204.

The signal control unit 272 monitors the transmitter 201, and performs signal control for causing a similar signal to flow through the assist transmission path 271. The similar signal has a similarity to the transmission signal that is output to the signal transmission path 204 by the transmitter 201.

The capacitance 273 is a capacitance that capacitively couples the signal transmission path 204 and the assist transmission path 271 to each other. The capacitance 273 may be a parasitic capacitance between the signal transmission path 204 and the assist transmission path 271 or an actual capacitance.

In the signal transmission system in FIG. 17 configured as described above, the signal control unit 212 monitors the transmitter 201, and causes a similar signal to flow through the assist transmission path 211 capacitively coupled to the signal transmission path 203 by the capacitance 213. The similar signal has a similarity to the transmission signal that is caused to flow through the signal transmission path 203 by the transmitter 201.

As a result, regarding the signal transmission path 203 and the assist transmission path 211, (adverse) effects of the parasitic capacitance of the signal transmission path 203 are easily reduced by the equal potential without feedback of a signal, and it is possible to suppress deterioration of the quality of the transmission signal that flows through the signal transmission path 203 due to the parasitic capacitance of the signal transmission path 203.

Further in the signal transmission system in FIG. 17, the signal control unit 272 monitors the transmitter 201, and causes a similar signal to flow through the assist transmission path 271 capacitively coupled to the signal transmission path 204 by the capacitance 273. The similar signal has a similarity to the transmission signal that is caused to flow through the signal transmission path 204 by the transmitter 201.

As a result, regarding the signal transmission path 204 and the assist transmission path 271, (adverse) effects of the parasitic capacitance of the signal transmission path 209 are easily reduced by the equal potential without feedback of a signal, and it is possible to suppress deterioration of the quality of the transmission signal that flows through the signal transmission path 204 due to the parasitic capacitance of the signal transmission path 204.

Note that in the specification, the "system" refers to a group of a plurality of constituent elements (apparatus, module (component), etc.), and whether or not all constituent elements are provided in the same casing is irrelevant. Therefore, a plurality of apparatuses that are accommodated in different casings and connected via a network and a single apparatus in which a plurality of modules are accommodated in a single casing are both referred to as system.

Note that embodiments of the present technology are not limited to the above-mentioned embodiments and various modifications can be made without departing from the essence of the present technology.

Further, the effects described in the specification are merely examples and are not limited, and additional effects may be provided.

It should be noted that the present technology may take the following configurations.

(1)

An image sensor, including:

a VSL (Vertical Signal Line), a signal output from a pixel flowing through the VSL;

an assist signal line that is adjacent to the VSL and placed along the VSL; and a signal control unit that causes a similar signal to flow through the assist signal line, the similar signal having a similarity to a signal that flows through the VSL.

(2)
The image sensor according to (1), in which
the VSL includes a plurality of VSLs.

(3)
The image sensor according to (1) or (2), in which
the assist signal line is placed so as to be capacitively coupled to the VSL.

(4)
The image sensor according to (3), in which
the assist signal line and the VSL are capacitively coupled to each other by a parasitic capacitance.

(5)
The image sensor according to any one of (1) to (4), in which
the assist signal line includes a plurality of assist signal lines, the plurality of assist signal lines being placed for one VSL.

(6)
The image sensor according to any one of (1) to (4), in which
the assist signal line is placed so as to surround the VSL.

(7)
The image sensor according to any one of (1) to (4), in which
the assist signal line is a different VSL, a signal of the same color as that of a signal that flows through the VSL flowing through the different VSL.

(8)
The image sensor according to (7), in which
signals output from pixels arranged in a Bayer pattern flow through the VSL, signals output from pixels arranged on the left or right of the pixels by two columns flowing through the assist signal line for the VSL.

(9)
A control method, including
causing, by an image sensor including
a VSL (vertical Signal Line), a signal output from a pixel flowing through the VSL, and
an assist signal line that is adjacent to the VSL and placed along the VSL,
a similar signal to flow through the assist signal line, the similar signal having a similarity to a signal that flows through the VSL.

(10)
An electronic apparatus, including:
an optical system that collects light; and
an image sensor that receives light and picks up an image,
the image sensor including
a VSL (Vertical Signal Line), a signal output from a pixel flowing through the VSL,
an assist signal line that is adjacent to the VSL and placed along the VSL, and
a signal control unit that causes a similar signal to flow through the assist signal line, the similar signal having a similarity to a signal that flows through the VSL.

(11)
A signal transmission system, including:
a wired assist transmission path that is adjacent to a wired signal transmission path and placed along the signal transmission path, a signal output from a transmitter flowing through the signal transmission path; and a signal control unit that causes a similar signal to flow through the assist transmission path, the similar signal having a similarity to a signal that flows through the signal transmission path.

(12)
The signal transmission system according to (11), in which
the signal transmission path includes a plurality of signal transmission paths.

(13)
The signal transmission system according to (11) or (12), in which
the assist transmission path is placed so as to be capacitively coupled to the signal transmission path.

(14)
The signal transmission system according to (13), in which
the assist transmission path and the signal transmission path are capacitively coupled to each other by a parasitic capacitance.

(15)
The signal transmission system according to any one of (11) to (14), in which
the assist transmission path includes a plurality of assist transmission paths, the plurality of assist transmission paths being placed for one signal transmission path.

(16)
The signal transmission system according to any one of (11) to (14), in which
the assist transmission path is placed so as to surround the signal transmission path.

(17)
The signal transmission system according to any one of (11) to (14), in which
the assist transmission path is a different signal transmission path.

(18)
A control method, including
causing, by a signal transmission system including
an assist transmission path that is adjacent to a signal transmission path and placed along the signal transmission path, a signal output from a transmitter flowing through the signal transmission path,
a similar signal to flow through the assist transmission path, the similar signal having a similarity to a signal that flows through the signal transmission path.

REFERENCE SIGNS LIST 1 optical system, 2 image sensor, 3 memory, 4 signal processing unit, 5 output unit, 6 control unit, 10 pixel array, $11_{1,1}$ to $11_{M,N}$ pixel, 20 logic unit, 21 vertical scanning unit, 22 column processing unit, 23 horizontal transfer unit, 24 amplifier 24, 25 signal processing unit, 31 DAC, $32_1$ to $32_N$ comparator, $33_1$ to $33_N$ counter, $34_1$ to $34_N$ current source, $41_1$ to $41_M$ pixel control line, $42_1$ to $42_N$ VSL, 51 PD, 52 transfer Tr, 52 FD, 54 reset Tr, 55 amplification Tr, 56 selection Tr, $61_1$ to $61_N$ assist VSL, $62_1$ to $62_N$ signal control unit, $63_1$ to $63_N$, 71 capacitance, 81 signal output unit, 82, 83 FET, 84 load unit, 85 current source, 86 capacitance, $91_1$ to $91_N$ assist VSL, $92_1$ to $92_N$ signal control unit, $93_1$ to $93_N$, 101 signal output unit, 102, 103 FET, 104 load unit, 105 current source, 106 capacitance, 201 transmitter, 202 receiver, 203,204 signal transmission path, 211 assist transmission path, 212 signal control unit, 213 capacitance, 221 assist transmission path, 231 transmitter, 232 receiver, 233 signal transmission path, 241 capacitance, 251 assist transmission path, 252 signal control unit, 253 capacitance, 271 assist transmission path, 272 signal control unit, 273 capacitance

What is claimed is:

1. An image sensor, comprising:
   a plurality of pixels;
   a plurality of VSLs (Vertical Signal Lines);
   an assist signal line, wherein the assist signal line is adjacent to a first VSL included in the plurality of VSLs,
   wherein the assist signal line is placed along the first VSL,
   wherein the assist signal line is capacitively coupled to the first VSL,
   wherein the assist signal line is a second VSL included in the plurality of VSLs,
   wherein signals from pixels in a first column of pixels flow through the first VSL,
   wherein signals output from pixels in a second column of pixels flow through the assist signal line,
   wherein the second column of pixels is separated from the first column of pixels by a third column of pixels, and
   wherein the assist signal line is placed so as to surround the first VSL; and
   a signal control unit that causes similar signals to flow through the assist signal line and the first VSL.

2. The image sensor according to claim 1, wherein the assist signal line and the first VSL are capacitively coupled to each other by a parasitic capacitance.

3. The image sensor according to claim 1, wherein the assist signal line includes a plurality of assist signal lines, the plurality of assist signal lines being placed so as to capacitively couple with the first VSL.

4. The image sensor according to claim 1, wherein a signal of a same color as that of a signal that flows through the first VSL flows through the assist signal line.

5. The image sensor according to claim 1, wherein the pixels are disposed in a Bayer array.

6. An electronic apparatus, comprising:
   an optical system that collects light; and
   an image sensor that receives light and picks up an image, the image sensor including:
   a plurality of pixels;
   a plurality of VSLs (Vertical Signal Lines);
   an assist signal line,
   wherein the assist signal line is adjacent to a first VSL included in the plurality of VSLs,
   wherein the assist signal line is placed along the first VSL,
   wherein the assist signal line is capacitively coupled to the first VSL,
   wherein the assist signal line is a second VSL included in the plurality of VSLs,
   wherein signals from pixels in a first column of pixels flow through the first VSL,
   wherein signals output from pixels in a second column of pixels flow through the assist signal line,
   wherein the second column of pixels is separated from the first column of pixels by a third column of pixels, and
   wherein the assist signal line is placed so as to surround the first VSL;
   and
   a signal control unit that causes similar signals to flow through the assist signal line and the first VSL.

7. The electronic apparatus according to claim 6, wherein the assist signal line and the first VSL are capacitively coupled to each other by a parasitic capacitance.

8. The electronic apparatus according to claim 6, wherein the assist signal line includes a plurality of assist signal lines, the plurality of assist signal lines being placed so as to capacitively couple with the first VSL.

9. The electronic apparatus according to claim 6, wherein a signal of a same color as that of a signal that flows through the first VSL flows through the assist signal line.

10. The electronic apparatus according to claim 6, wherein the pixels are disposed in a Bayer array.

* * * * *